(12) United States Patent
Sabah

(10) Patent No.: US 9,912,037 B2
(45) Date of Patent: Mar. 6, 2018

(54) PLANAR INVERTED-F WING ANTENNA FOR WIRELESS CULINARY APPLIANCES

(71) Applicant: Knowles Capital Formation Inc., Itasca, IL (US)

(72) Inventor: Sabah Sabah, Nashua, NH (US)

(73) Assignee: MICROSEMI CORP.—HIGH PERFORMANCE TESTING, Aliso Viejo, CA (US)

( * ) Notice: Subject to any disclaimer, the term of this patent is extended or adjusted under 35 U.S.C. 154(b) by 76 days.

(21) Appl. No.: 14/933,681

(22) Filed: Nov. 5, 2015

(65) Prior Publication Data

US 2016/0134009 A1 May 12, 2016

Related U.S. Application Data

(63) Continuation of application No. PCT/US2014/037313, filed on May 8, 2014.
(Continued)

(51) Int. Cl.
*H01Q 1/24* (2006.01)
*H01Q 1/22* (2006.01)
(Continued)

(52) U.S. Cl.
CPC .............. *H01Q 1/22* (2013.01); *G01K 11/265* (2013.01); *H01Q 9/0421* (2013.01); *G01K 2207/06* (2013.01); *H05B 2213/07* (2013.01)

(58) Field of Classification Search
USPC .......................... 343/700 MS, 770, 702, 725
See application file for complete search history.

(56) References Cited

U.S. PATENT DOCUMENTS 6,160,513 A * 12/2000 Davidson ............. H01Q 9/0442
343/700 MS
6,320,169 B1 * 11/2001 Clothier ............... G06K 7/0008
219/620
(Continued)

FOREIGN PATENT DOCUMENTS

EP         2527808 A1    11/2012
JP      2013046401 A     3/2013
JP      2013046402 A     3/2013

OTHER PUBLICATIONS

Kin-Lu Wong, "Compact and Broadband Microstrip Antennas", 2002, John Wiley & Son, Inc.*
(Continued)

*Primary Examiner* — Jessica Han
*Assistant Examiner* — Hai Tran
(74) *Attorney, Agent, or Firm* — Maine Cernota & Rardin

(57) ABSTRACT

A Planar Inverted-F Wing Antenna (PIFWA) device, system, and method used for commercial and residential induction cooking tops, ovens, combo-steamers, and pressure cookers. The outline of the PIFWA is an isosceles triangle with a truncated vertex end opposite the base side. The PIFWA transmits and receives (TX/RX) signals with wireless sensors including Surface Acoustic Wave (SAW) devices. The antenna comprises a device, system, and method to monitor the cooking process and temperature of food. Embodiments of the PIFWA antenna operate at about 433 MHz, have a feed between two slots, and a shorting plate at the opposing end. Antenna location and alignment within the culinary appliance provides uniform signal strength and gain performance in the regions occupied by one or more sensors.

21 Claims, 24 Drawing Sheets

Related U.S. Application Data

(60) Provisional application No. 61/821,414, filed on May 9, 2013.

(51) Int. Cl.
  *H01Q 9/04* (2006.01)
  *G01K 11/26* (2006.01)

(56) References Cited

U.S. PATENT DOCUMENTS

| | | | |
|---|---|---|---|
| 7,080,593 B1 | 7/2006 | Frankel | |
| 2006/0012524 A1 | 1/2006 | Mierke et al. | |
| 2008/0122629 A1* | 5/2008 | Yamagajo | G06K 19/07749 340/572.7 |
| 2009/0188396 A1 | 7/2009 | Hofmann et al. | |
| 2010/0026605 A1* | 2/2010 | Yang | H01Q 9/0421 343/895 |
| 2011/0140977 A1* | 6/2011 | Yang | H01Q 1/2216 343/725 |
| 2012/0188133 A1* | 7/2012 | Sabah | G01K 1/024 343/720 |
| 2012/0313824 A1* | 12/2012 | Watanabe | H01Q 1/48 343/700 MS |

OTHER PUBLICATIONS

PCT Search Report dated Sep. 3, 2014 of Patent Application No. PCT/US14/37313 filed May 8, 2014.

Kin-Lu Wong: "Compact and Broadband Microstrip Antennas" In: "Compact and Broadband Microstrip Antennas", Dec. 31, 2002 (Dec. 31, 2002), John Wiley & Sons, New York, XP055176086, ISBN: 978-0-47-122111-1, pp. 1-324.

Han T-Y et al: "Shorted planar triangular patch antenna with dual-frequency operation", AEU—International Journal of Electronics and Communications, Elsevier, Amsterdam, NL, vol. 63, No. 2, Feb. 4, 2009 (Feb. 4, 2009), pp. 103-107, XP025874570, ISSN: 1434-8411, DOI: 10.1016/J.AEUE.2007.11.001, [retrieved on Feb. 20, 2008].

Kronberger R et al: "Multiband Planar Inverted-F Car Antenna for Mobile Phone and GPS", IEEE Antennas and Propagation Society International Symposium. 1999 Digest. APS. Orlando, FL, Jul. 11-16, 1999; [IEEE Antennas and Propagation Society International Symposium], New York, NY : IEEE, US, Jul. 11, 1999 (Jul. 11, 1999), pp. 2714-2717, XP000935587, ISBN: 978-0-7803-5640-5.

Supplementary European Serarch Report of European Application No. EP14794061, dated Dec. 1, 2016, 13 pages.

* cited by examiner

900

9 A  9 B 9C  9D

1400

2000

PLANAR INVERTED-F WING ANTENNA FOR WIRELESS CULINARY APPLIANCES

RELATED APPLICATIONS

This application is a continuation of PCT Application No. PCT/US2014/037313 filed 8 May 2014 which claims the benefit of U.S. Provisional Application No. 61/821,414 filed 9 May 2013. Each of these applications is herein incorporated by reference in their entirety for all purposes.

FIELD OF THE INVENTION

The invention relates to a Planar Inverted-F Wing Antenna (PIFWA) used in commercial and residential induction cooking tops, ovens, combo-steamers and pressure cookers. The PIFWA is used to transmit and receive (TX/RX) signals with a wireless Surface Acoustic Wave (SAW) or other sensor. The device, system, and method are used to monitor the cooking process and temperature of the food. Embodiments of the PIFWA antenna are configured for use with a surface acoustic wave (SAW) device for wireless temperature sensing.

BACKGROUND OF THE INVENTION

Cooking unit parameter measurement (such as temperature measurement) is a difficult environment. For example, significant heat is present, there are sanitary requirements, and there are important safety demands. Reliable, accurate, and convenient operation is needed. Wired probes exist, but they are not convenient; the cables can be damaged or cut. Wireless probe systems can be complex, expensive, and unreliable. The transmit/receive frequencies employed interact with the metals of appliances to make reliable measurement very difficult. Where antenna signal strength patterns are not smooth, but notched, the link budget for probes can be too restrictive for reliable, accurate, operation. A probe placed in a low signal strength area proximate an appliance may fail to provide any signal. Considerations include power flux density, field strength, phase, polarization, and near-field effects. Missing probe signals can produce erroneous measurement values, leading to poor cooking results. Poor cooking, such as undercooking, can lead to serious illness.

Antennas, the ground plane environment, and materials must all be considered to produce results acceptable for wireless operation. The ground plane of the antenna plays a significant role in its operation. For example, if the ground plane is much larger than $\lambda/2$, radiation patterns will become increasingly multilobed. Alternatively, if the ground plane is significantly smaller than $\lambda/2$, tuning becomes increasingly difficult, and overall performance degrades. Additionally, ground surface waves can produce spurious radiation, or couple energy at discontinuities, leading to distortions in the main pattern, or unwanted loss of power.

What is needed is an antenna device and wireless transmit/receive system for communication between at least one wireless sensor and a culinary appliance to monitor the cooking process including temperature of food that provides uniform signal strength and gain performance in the near-field regions occupied by the sensor(s).

SUMMARY OF THE INVENTION

An embodiment provides a Planar Inverted-F Wing Antenna (PIFWA) device comprising a feed end; a shorting end opposite the feed end; a feed section between a first slot and a second slot; a first wing section on a side of the first slot opposite the feed section; a second wing section on a side of the second slot opposite the feed section; wherein the outline configuration of the PIFWA in the plane of the PIFWA is an isosceles triangle with a truncated vertex end opposite the base side; the PIFWA device located proximate a culinary appliance. In embodiments the culinary appliance is a cooktop. In other embodiments, the culinary appliance is an induction cooktop. In subsequent embodiments a feed side of the PIFWA is aligned perpendicular to an adjacent side of a cooktop, located proximate a corner of the cooktop. For additional embodiments the operating frequency of the PIFWA is about 433 MHz. In another embodiment, the PIFWA has an impedance bandwidth of least about 13 MHz. In included embodiments the PIFWA has a maximum gain of about 3.6 dB. In yet further embodiments the culinary appliance is an oven, a pressure cooker, or a combo-steamer. Embodiments further provide that the PIFWA communicates with a surface acoustic wave (SAW) sensor. For a following embodiment the PIFWA communicates with a surface acoustic wave (SAW) sensor and values of measurements made by the sensor are used to control the power of the culinary appliance. In subsequent embodiments the PIFWA is located within a cooktop, the location comprising a shorting edge of the shorting end, the shorting edge parallel to and separated from a first inner side of the cooktop by about 76.8 mm measured perpendicular to the shorting edge; a corner of the first wing, the corner of the first wing proximate a second inner side of the cooktop, the corner of the first wing separated from the second inner side of the cooktop by about 8.8 mm. In additional embodiments the PIFWA dimensions comprise a shorting edge width approximately equal to a slot length; an overall length approximately equal to an overall width; a slot width approximately equal to one fifth of a wing end width; and a feed leg width approximately one third of the slot width. In included embodiments the PIFWA dimensions comprise an overall length of about 118 mm; an overall width of about 118 mm; a wing width of about 47.5 mm; a wing outer edge length of about 122.8 mm; a feed leg width of about 3 mm; slot widths of about 10 mm each; a slot length of about 55 mm; and an overall height of about 15.3 mm.

Another embodiment provides a method for measuring physical parameter values with a culinary appliance comprising the steps of providing at least one Planar Inverted-F Wing Antenna (PIFWA) proximate the culinary appliance; wherein the outline configuration of the PIFWA in the plane of the PIFWA is an isosceles triangle with a truncated vertex end opposite the base side; transmitting at least one RF signal from the at least one PIFWA; receiving at at least one wireless sensor, the RF signal transmitted from the PIFWA; radiating from the at least one wireless sensor, at least one RF signal; receiving, at the at least one PIFWA, the radiated signal from the at least one wireless sensor; the at least one RF signal transmitted from the at least one PIFWA and the at least one RF signal radiated from the at least one wireless sensor corresponding to the measured physical parameter values. In related embodiments at least one wireless sensor is a surface acoustic wave (SAW) sensor. For further embodiments at least one surface acoustic wave (SAW) sensor is a temperature sensor. In ensuing embodiments, the culinary appliance is a cooktop. In yet further embodiments at least one wireless sensor is a surface acoustic wave (SAW) temperature probe.

A yet further embodiment provides a system for measuring physical parameter values with a culinary appliance with a Planar Inverted-F Wing Antenna (PIFWA) comprising a PIFWA feed end; a PIFWA shorting end opposite the feed end; a PIFWA feed section between a first slot and a second slot, the feed section extending beyond the line of the base side; a PIFWA first wing section on a side of the first slot opposite the feed section; a PIFWA second wing section on a side of the second slot opposite the feed section, wherein the outline configuration of the PIFWA in the plane of the PIFWA is an isosceles triangle with a truncated vertex end opposite the base side; the PIFWA located proximate a culinary appliance; and the PIFWA providing RF communication with a surface acoustic wave (SAW) sensor whereby values of measurements made by the sensor are used to control power of the culinary appliance.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

PIFWA antenna system embodiments have an advantage in that the ground plane of the antenna plays a significant role in its operation. By using the appliance's metal walls or body as the antenna ground plane (which is much longer than $\lambda/2$ for 433 MHz), the radiation patterns become increasingly multi lobed. Embodiments exhibit omni radiation patterns.

Additionally, for embodiments, the antenna is low cost and easy to assemble in the culinary appliances; it has a relatively high gain and suitable radiation pattern for ovens and cooking top/hop applications; up to a 15% bandwidth is possible.

Embodiment applications comprise culinary appliances such as cooking hops (tops), cooking ovens, combo-steamers, and pressure cookers.

In embodiments, nonlimiting shapes for the antenna comprise: round, wing design as for a cooking top, rectangular, and triangular. Other shapes are possible.

GLOSSARY To assist in understanding, terminology is initially defined.

Antenna shorting edge width is the width of the antenna side opposite the feed side of a PIFWA.

Coaxial cable feed is the input connection to the feed slot of a PIFWA.

Feed width is the width of the feed leg between the two slots of a PIFWA.

Inverted-F Antenna (IFA) has the feed placed from the ground plane to the upper arm of the IFA. The upper arm of the IFA has a length approximately a quarter wavelength. Beside the feed, the upper arm is shorted to the ground plane. The feed is closer to the shorting pin than to the open end of the upper arm. The structure somewhat resembles an Inverted-F.

Near-field is the region within one wavelength of the transmit point.

Planar Inverted-F Antenna (PIFA) is a variant of a linear inverted-F antenna with the wire radiator element replaced by a plate. The PIFA is resonant at a quarter-wavelength due to the shorting pin at the end. The feed is placed between the open and shorted end. In PIFAs, the shorting pin can be a plate.

Slot length is the distance from end of the adjacent wing to the enclosed end of the slot of a PIFWA.

Slot width is the distance between the side edge of the feed leg and the adjacent wing edge of a PIFWA.

Wing width is the width of the independent end of the identified wing of a PIFWA opposite the shorting end.

Figure 1:
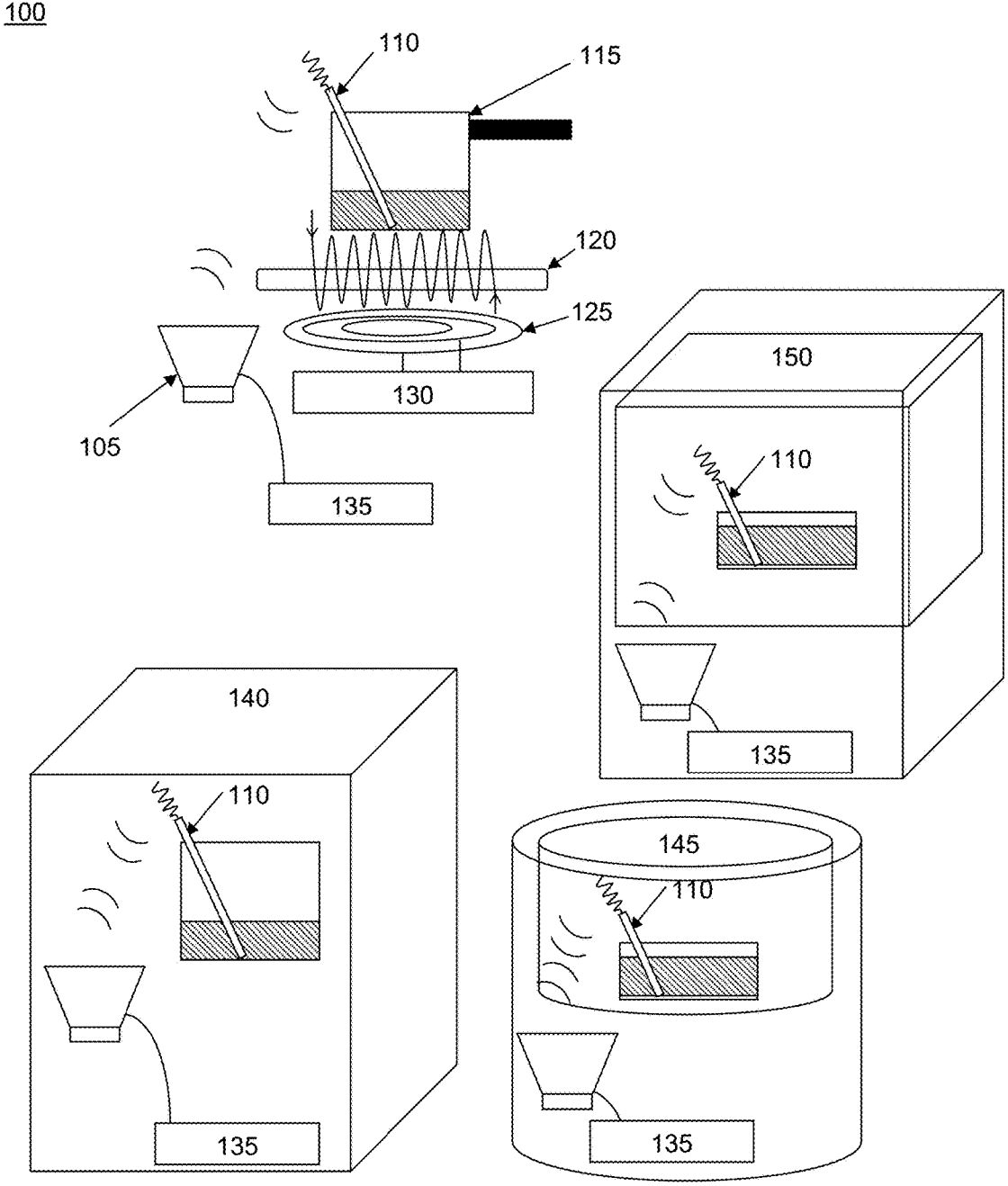
FIG. 1 depicts simplified culinary appliance application environments for an embodiment of the present invention.

FIG. 1 depicts simplified planar Inverted-F Wing Antenna (PIFWA) culinary appliance application environments 100 for embodiments of the present invention. For a cooktop, PIFWA 105 communicates with wireless food probe 110; induction pot (magnetic) 115 is on ceramic-glass top plate 120; beneath is induction coil 125; fed by electrical power source 130. Electronics 135 interface with antenna 105. For measurements, diameter of pot 115 (with water) was 175 mm and the antenna of probe 110 was 95 mm over the glass of the cook top. Additional culinary appliances include oven 140, pressure cooker 145, and combo-steamer 150.

Figure 2:
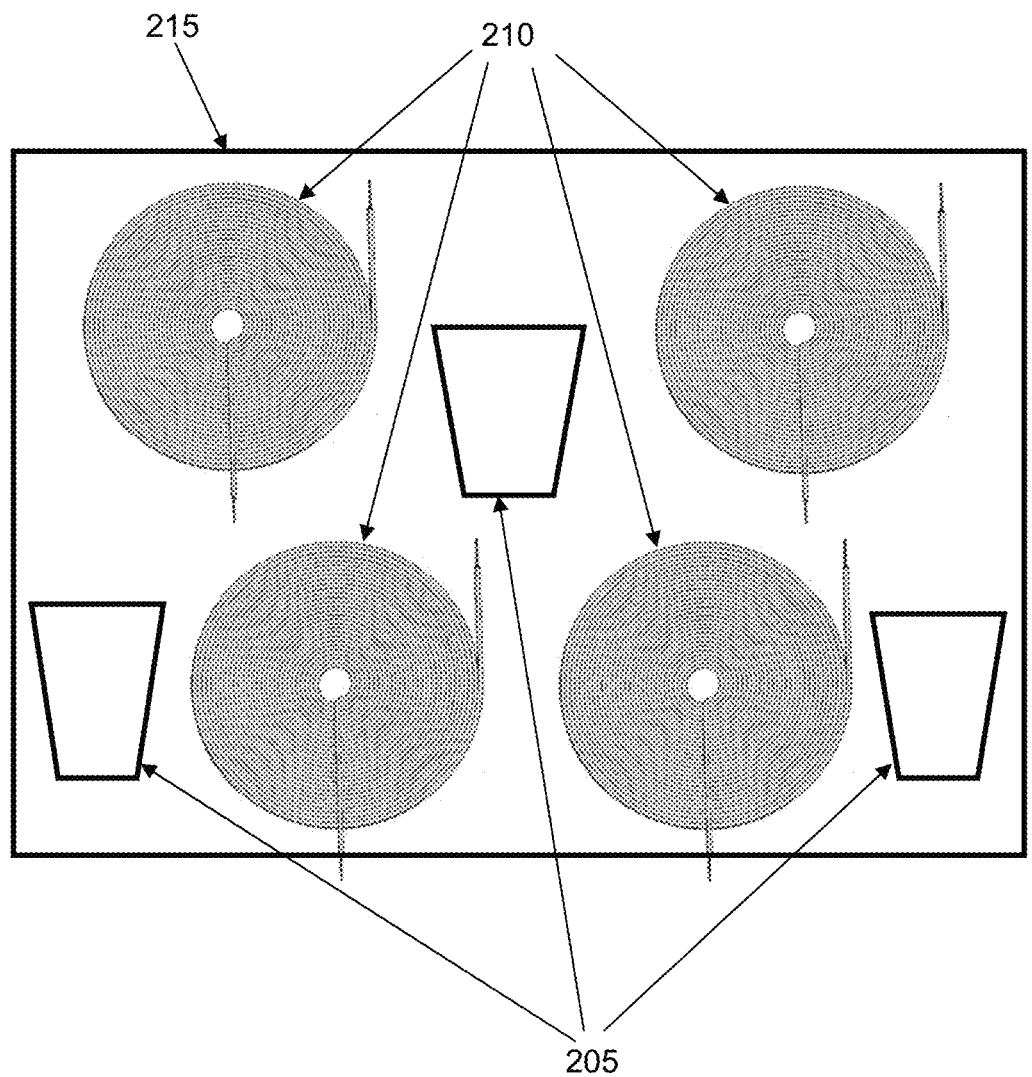
FIG. 2 depicts a simplified Planar Inverted-F Wing Antenna (PIFWA) cook top application layout for an embodiment of the present invention.

FIG. 2 depicts a simplified plan view 200 of an induction cook top layout. Nonlimiting PIFWA antenna locations 205 are shown with induction coil example locations 210 on cooktop 215.

Figure 3:
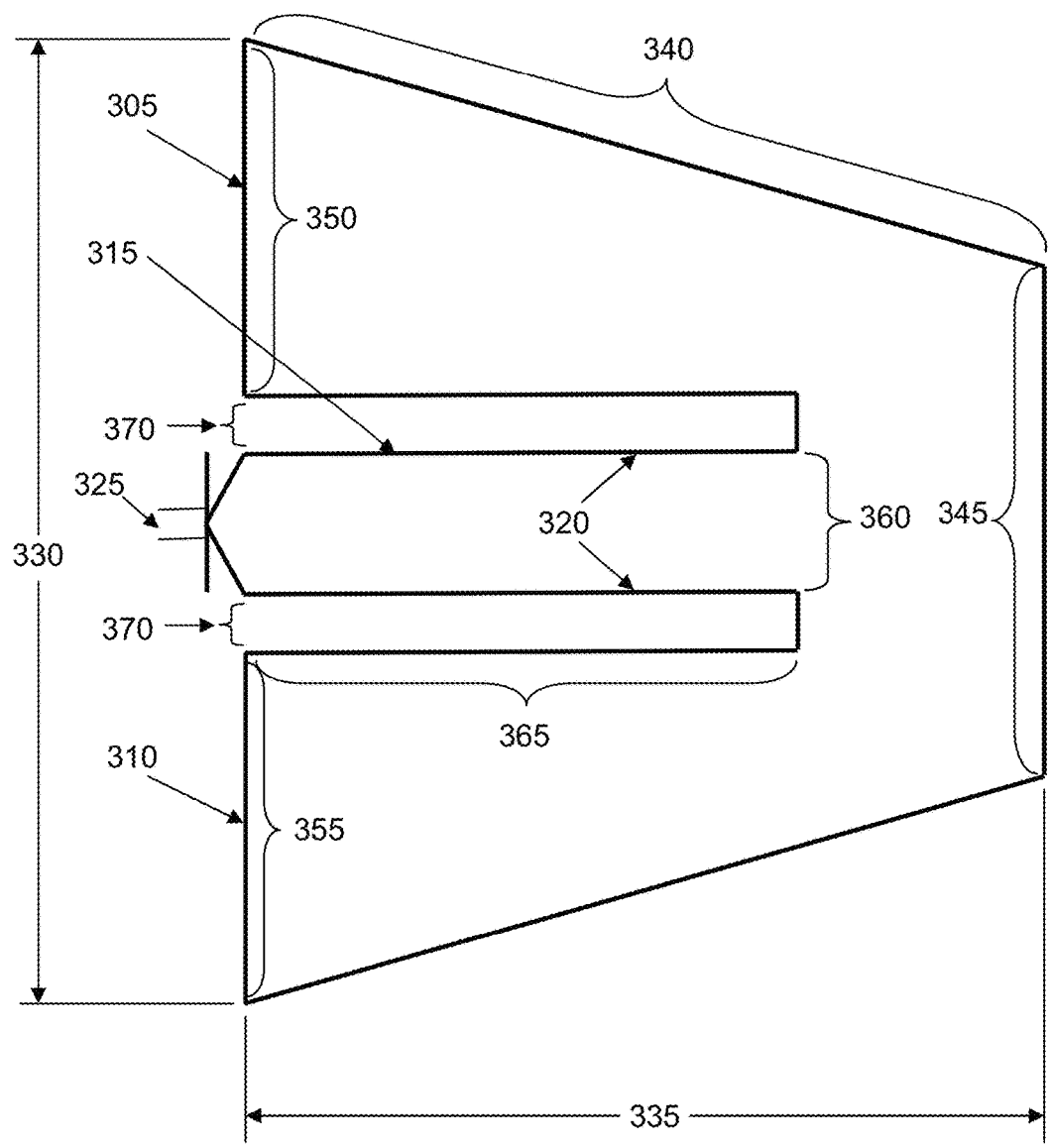
FIG. 3 depicts a planar wing-shaped antenna for an embodiment of the present invention.

FIG. 3 depicts a planar wing-shaped antenna 300. Components comprise first wing 305; second wing 310, feed 315; slots 320; and coaxial cable feed 325. Dimension nomenclature includes overall width 330; overall length 335; wing outer edge length 340; antenna shorting edge width 345; first wing width 350; second wing width 355; feed width 360; slot length 365; and slot width 370. The outline of the antenna in the plane of the antenna is an isosceles triangle with a truncated vertex at the shorting edge end, having shorting edge width 345 opposite the base side having overall width 330. For embodiments, each symmetric wing has a right triangle outline in the plane of the antenna with a truncated vertex along the altitude, opposite the base side having overall width 305, 310. In embodiments, feed 315 extends beyond line of base side having overall width 330.

Figure 4:
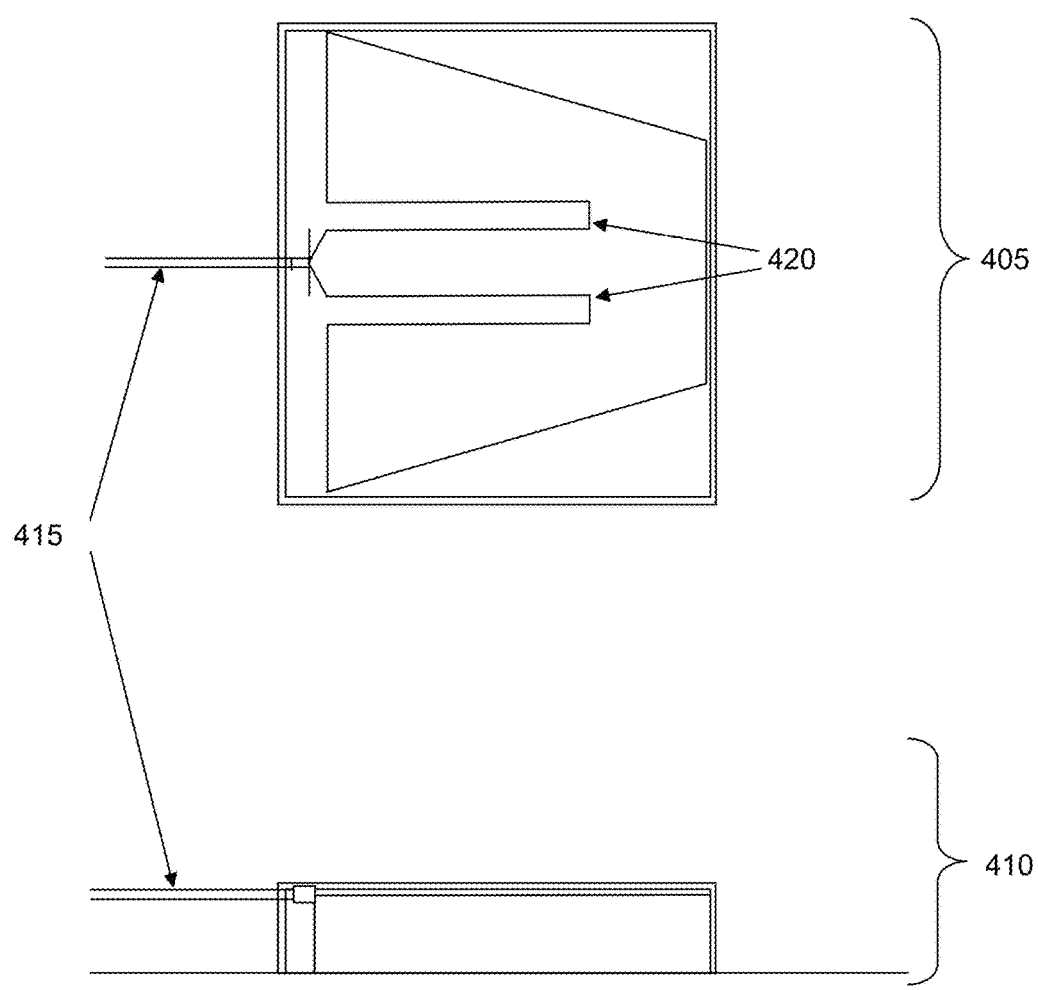
FIG. 4 is a planar wing-shaped antenna embodiment for air-filled free space modeling configured in accordance with the present invention.

FIG. 4 depicts views of a planar wing-shape antenna embodiment 400 shown in FIG. 3. Included in views are plan projection 405; side projection 410 showing feed line 415. Views are to scale and slots 420 are narrower (and feed wider) than those of the embodiment of FIG. 7. A computer model of this embodiment provides the data for the free-space performance parameters depicted in FIGS. 5 and 6.

Figure 5:
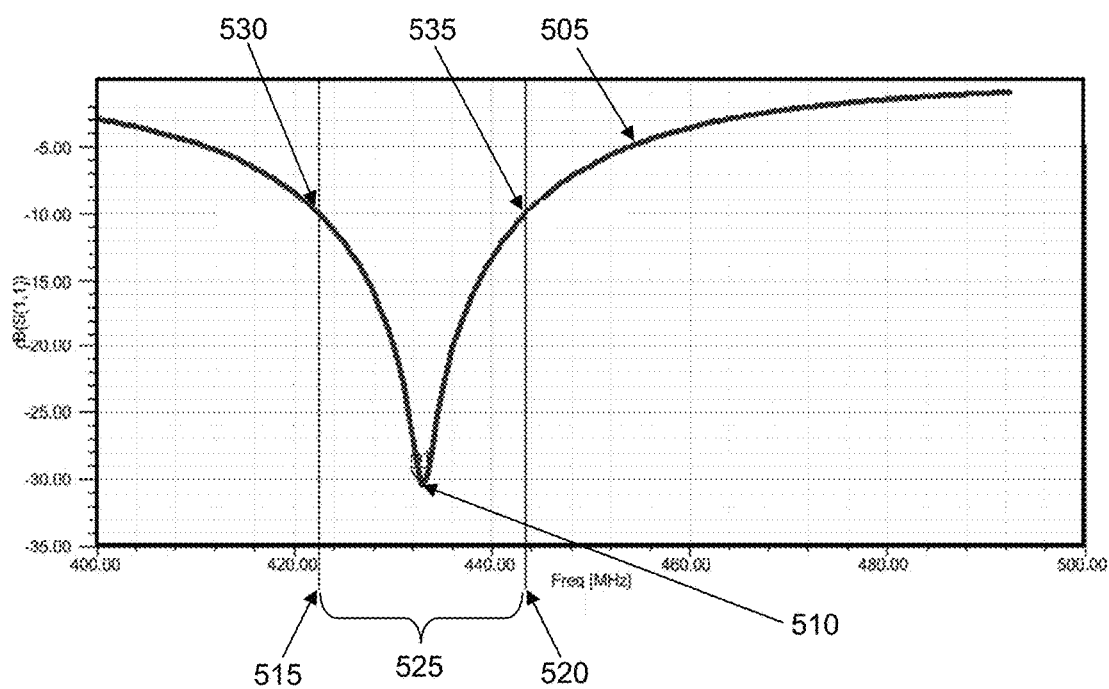
FIG. 5 is a planar wing-shaped antenna air-filled free space reflection coefficient plot configured in accordance with the present invention.

FIG. 5 depicts air-filled free space dB(S(1, 1)) reflection coefficient sweep setup plot 500 for the planar wing-shape antenna embodiment of FIG. 4. Curve 505 includes point ml 510 with values of 433.0000 MHz and −30.4230 dB. The curve's −10 dB points are from 422.5500 MHz 515 to 443.4500 MHz 520, a 20.900 MHz band 525. Point 530 value at 422.5500 MHz is −10.0851 dB. Point 535 value at 443.4500 MHz is −10.0101 dB.

Figure 6:
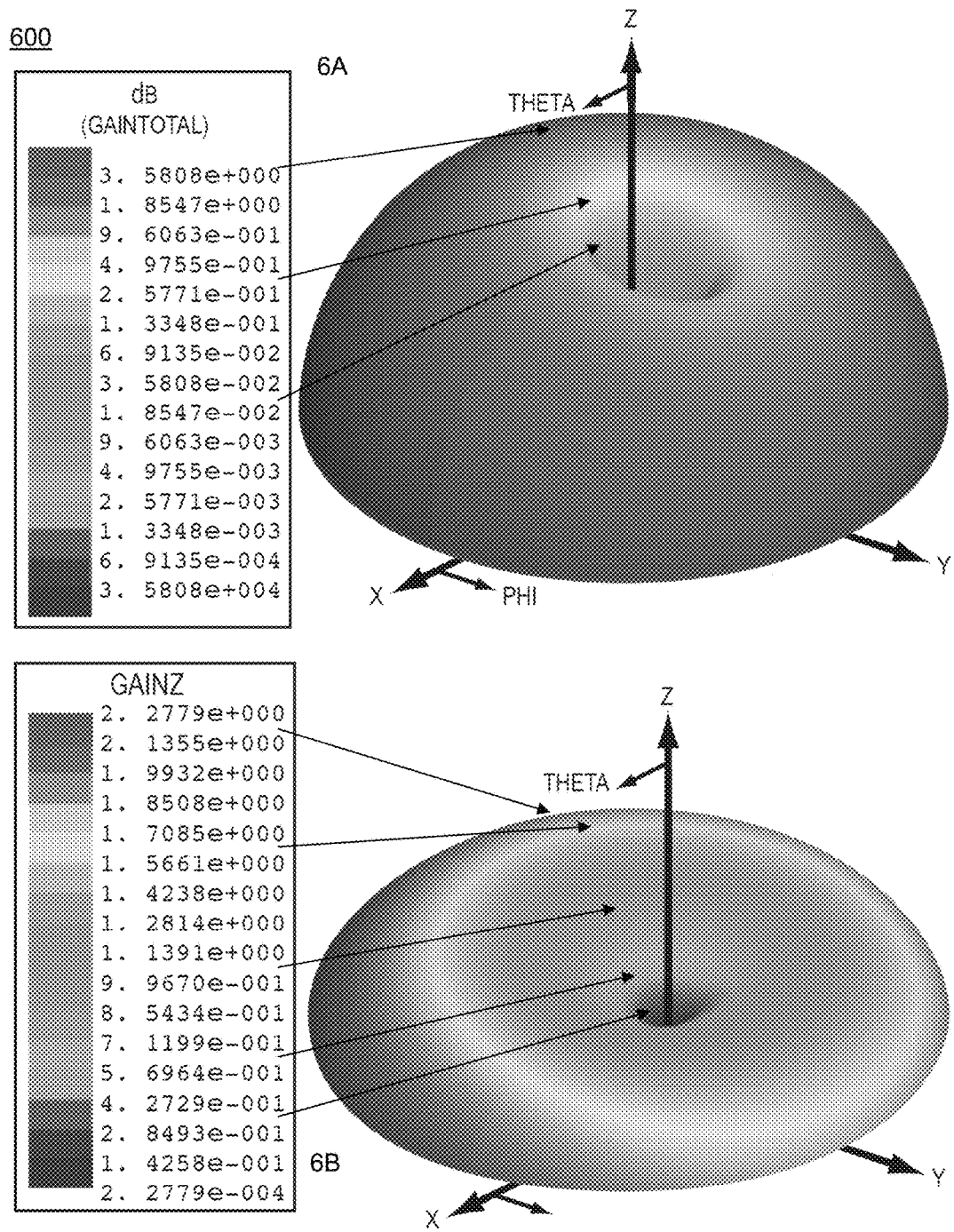
FIG. 6 is a planar wing-shaped antenna air-filled free space gain plot configured in accordance with the present invention.

FIG. 6 depicts air-filled free space gain plot in dB 600 for the planar wing-shape antenna embodiment of FIG. 4. Upper plot is total gain plot 6A and lower plot is vertical polarization gain 6B, in dB.

Figure 7:
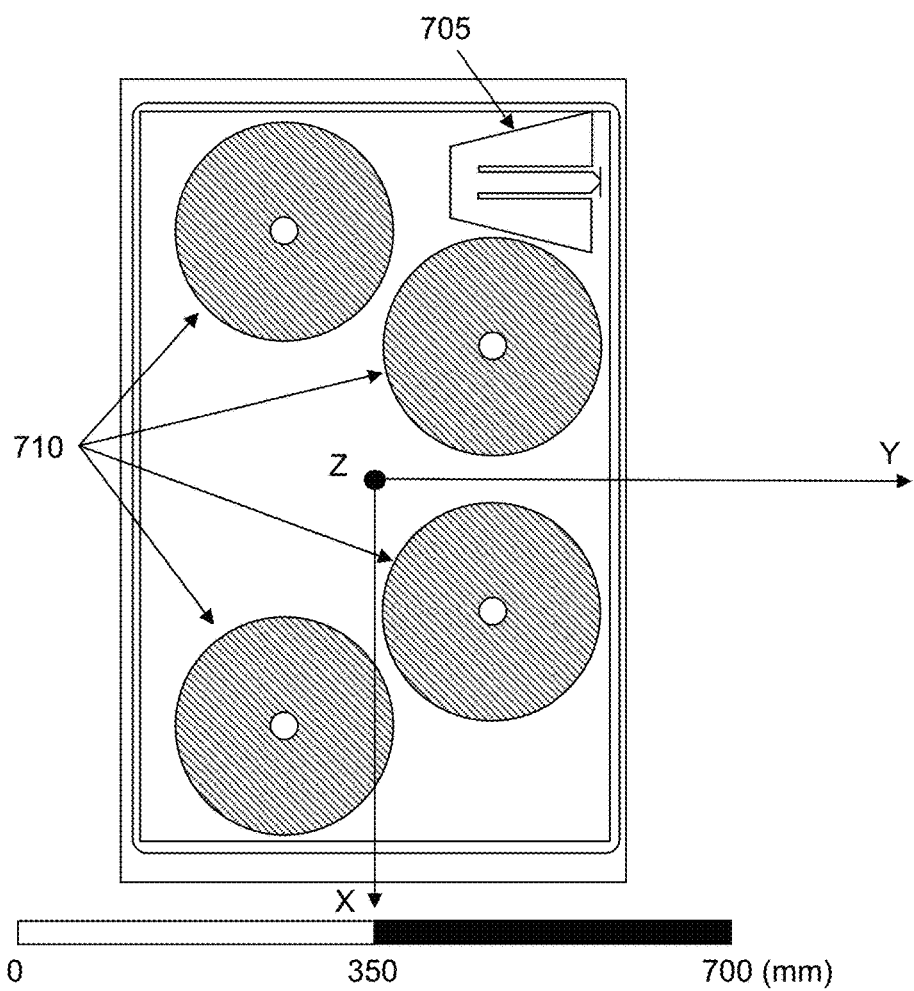
FIG. 7 depicts a scale drawing for corner placement of a planar wing-shaped antenna embodiment configured in accordance with the present invention.

FIG. 7 depicts a first modeled PIFWA embodiment in a cook top with corner placement 700. Various results show that the presence of the large metal coils in the cooktop has a severe effect on the performance of the PIFWA. The surrounding metal cooktop lip also has a negative impact.

Figure 8:
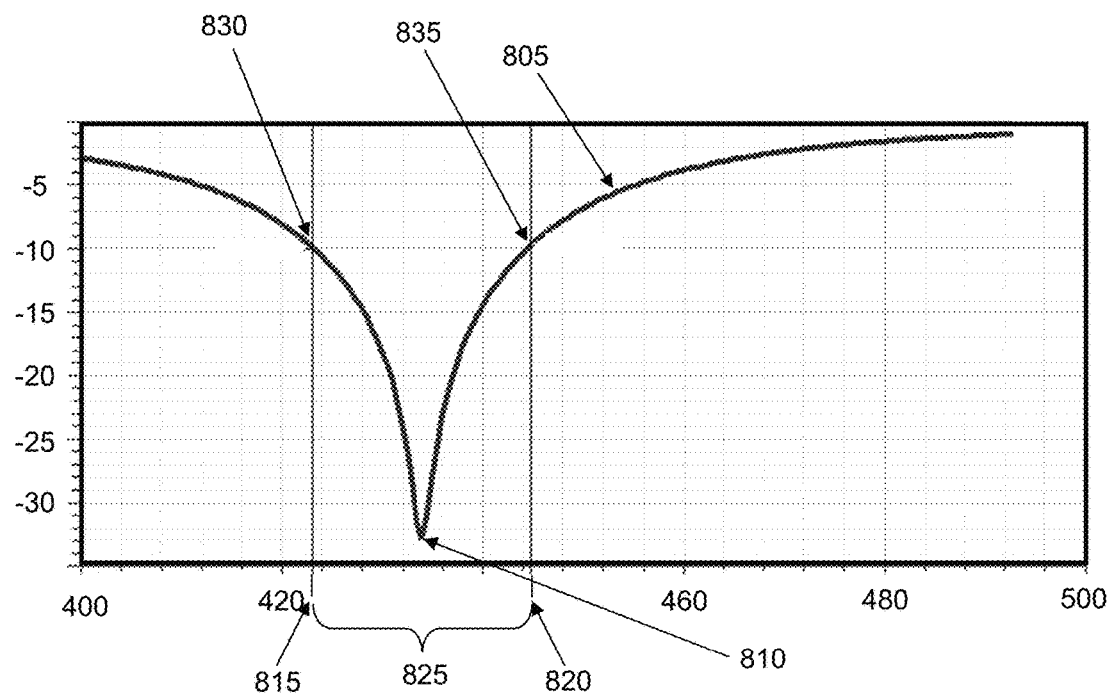
FIG. 8 is a reflection coefficient plot for the FIG. 7 corner placement of a planar wing-shaped antenna configured in accordance with the present invention.

FIG. 8 is a reflection coefficient plot 800 for another modeled PIFWA embodiment showing adequate bandwidth, depicting tuning to about 433 MHz. Curve 805 includes point ml 810 with values of 430 MHz and −33 dB. The curve's −10 dB points are from 423.1390 MHz 815 to 444.8430 MHz 820, a 21.7040 MHz band 825. Point 830 value at 423.1390 MHz is −9.9317 dB. Point 835 value at 444.8430 MHz is −9.7187 dB.

Figure 9:
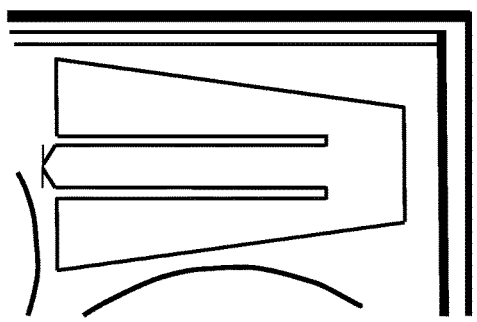
FIG. 9 depicts a first set of four examples of corner placements of planar wing-shaped antenna embodiments configured in accordance with the present invention.
Figure 9:
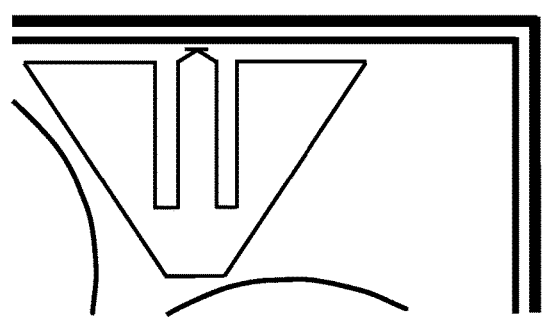
Figure 9:
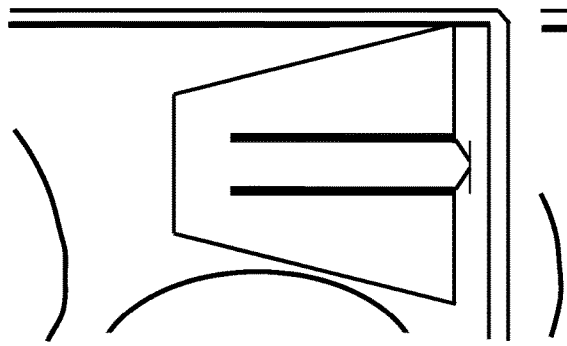
Figure 9:
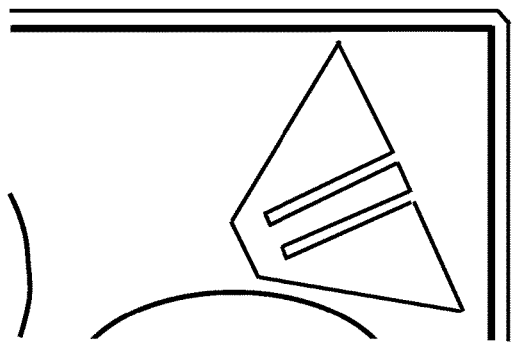

FIG. 9 depicts a first set of four to-scale antenna embodiments and placements 900. Embodiment 9A is tuned to the desired 433 MHz center frequency comprising an elongated main body of the PIFWA with an expanded width of the transmission line, increasing antenna bandwidth. Embodiment 9B depicts the feed aligned with one of the cooktop walls. This accommodates antenna shape while keeping the feed from the heating elements. Embodiment 9C depicts the feed aligned with another one of the cooktop walls. This also accommodates the antenna shape while keeping the feed away from the heating elements. Embodiment 9D depicts the feed mounted at an angle relative to the edges. This accommodates the antenna shape while keeping the feed away from the heating elements. For embodiments, angle may vary while maintaining performance.

Figure 10:
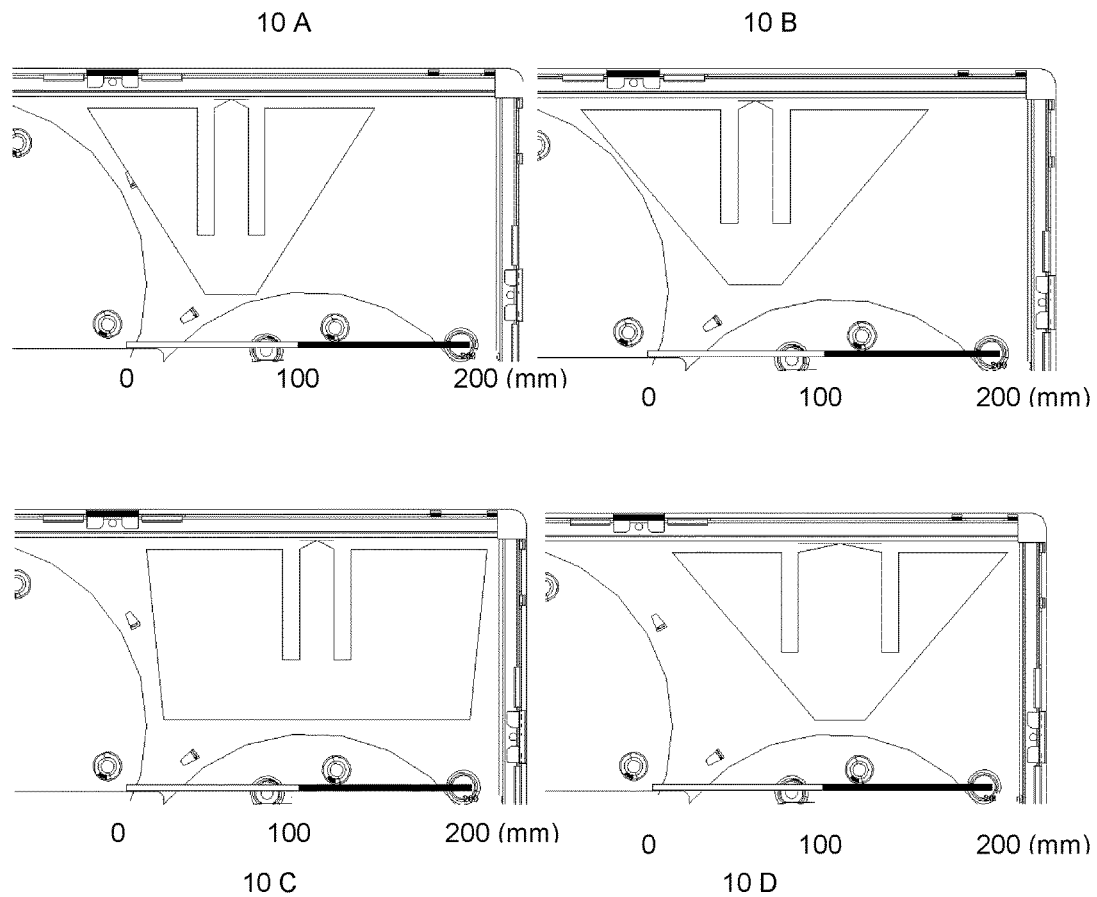
FIG. 10 depicts a second set of four examples of corner placements of planar wing-shaped antenna embodiments configured in accordance with the present invention.

FIG. 10 depicts a second set of four to-scale antenna embodiments and placements 1000. Embodiment 10A has the feed side parallel to the cooktop edge, with similar, equilateral, triangular side lengths, and slots of average width and separation. Embodiment 10B also has the feed side parallel to the cooktop edge, similar isosceles triangular side lengths with the (feed) base longer than the sides, and slots of average width and separation. Embodiment 10C similarly has the feed side parallel to the cooktop edge with a rectangular wing configuration and slots of average width and separation. Embodiment 10D depicts the feed side parallel to the cooktop edge, similar isosceles triangular side lengths with the (feed) base longer than the sides, and slots of average width with a separation approximately three times slot width.

Figure 11:
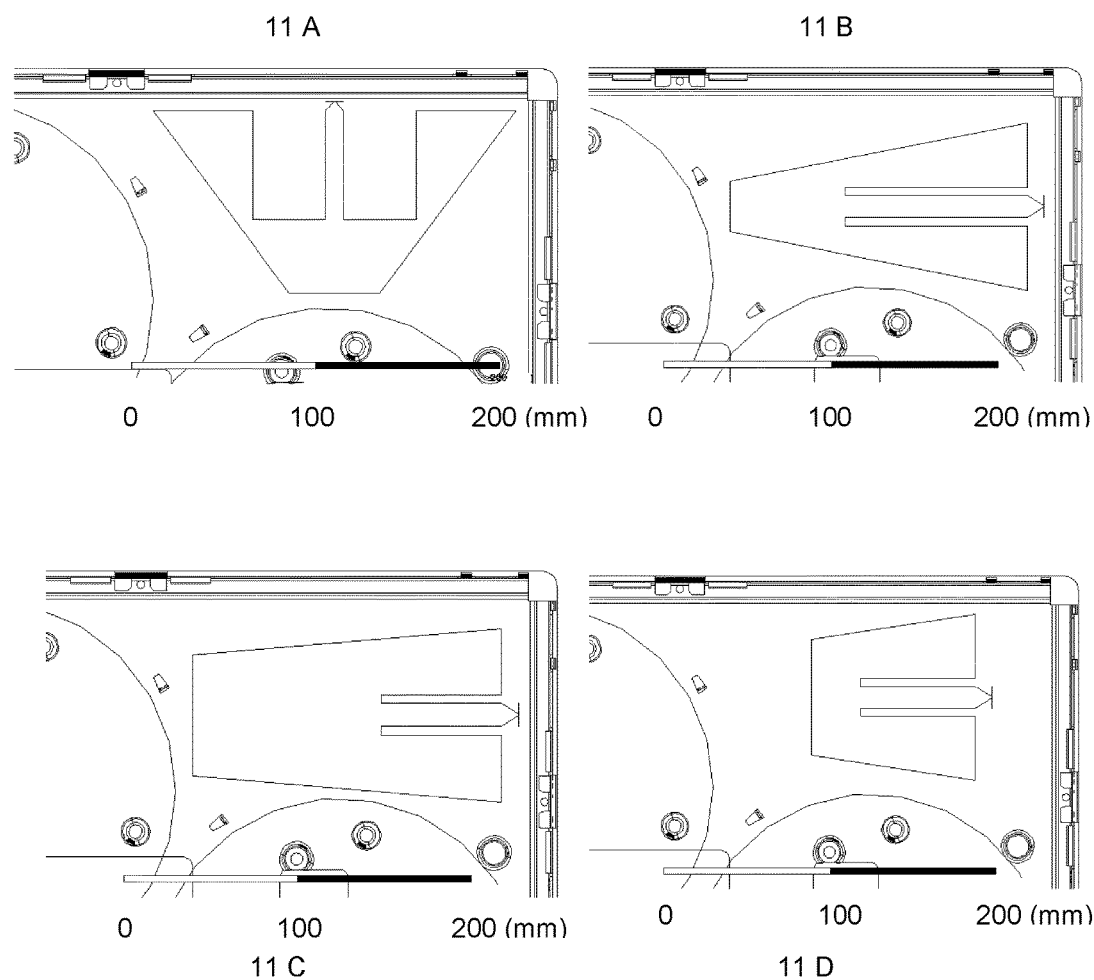
FIG. 11 depicts a third set of four examples of corner placements of planar wing-shaped antenna embodiments configured in accordance with the present invention.

FIG. 11 depicts a third set of four to-scale antenna embodiments and placements 1100. Embodiment 11A has the feed side parallel to the cooktop edge, similar isosceles triangular side lengths with the (feed) base longer than the sides, and wide slots each approximately one-quarter the base length, with a separation of approximately one-quarter the slot width. Embodiment 11B has the feed side parallel to the cooktop edge, similar isosceles triangular side lengths with the (feed) base shorter than the sides, and slots of narrow width with a separation approximately twice one slot width. Embodiment 11C has the feed side parallel to the cooktop edge, a rectangular outline, side length approximately two to one with the (feed) base one of the shorter sides, and slots of narrow width with a separation approximately twice one slot width. Embodiment 11D has the feed side parallel to cooktop edge, a generally square outline, and slots of narrow width with a separation approximately twice one slot width.

Figure 12:
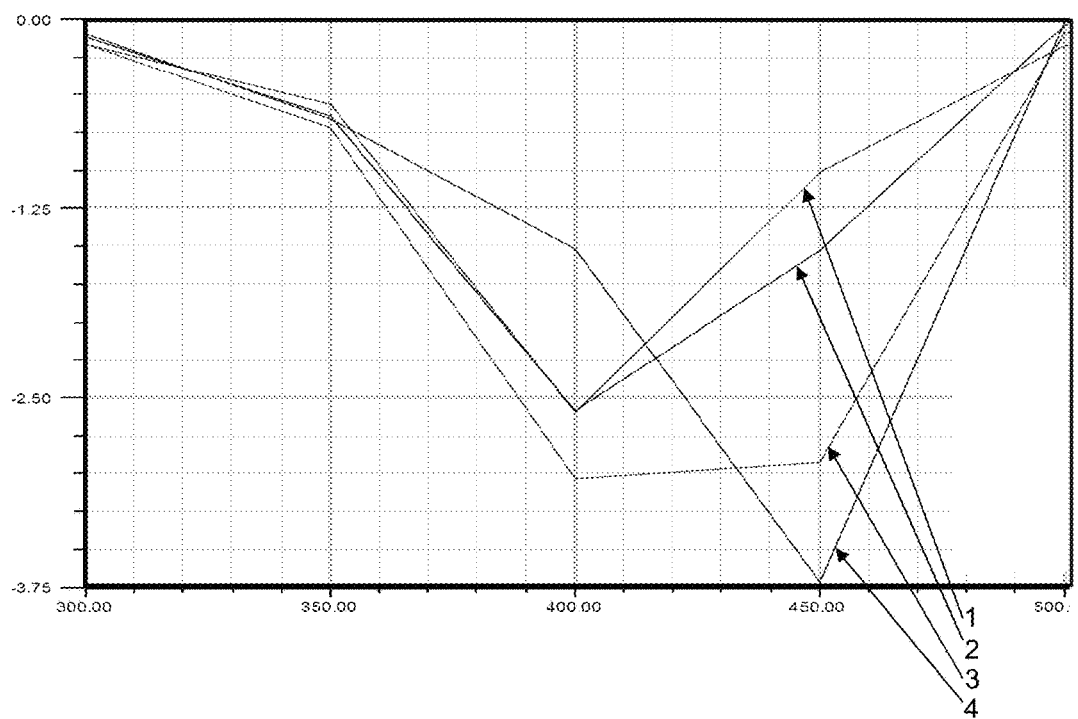
FIG. 12 is an S(1, 1) plot of planar wing-shaped antenna embodiments configured in accordance with the present invention.

FIG. 12 is an S(1, 1) plot 1200 of curves 1-4 (10A-10D, respectively) in dB depicting the presence of the large metal coils and the lip of the cooktop surrounding the antenna; results are highly localized. Deep resonances in the reflection coefficient exist, and slight changes in antenna configuration produce vastly different results. Examples of this are evident in the four curves plotted. Other embodiments include variations on both a rectangular PIFWA and simple transmission line antenna (no short at the end). Antenna height was examined to determine if any benefits could be achieved by physically decoupling the antenna surface from the lossy glass top. Generally, for embodiments, less desirable results were found, so antenna height has been kept constant for embodiments, coincident with the bottom of the glass.

Figure 13:
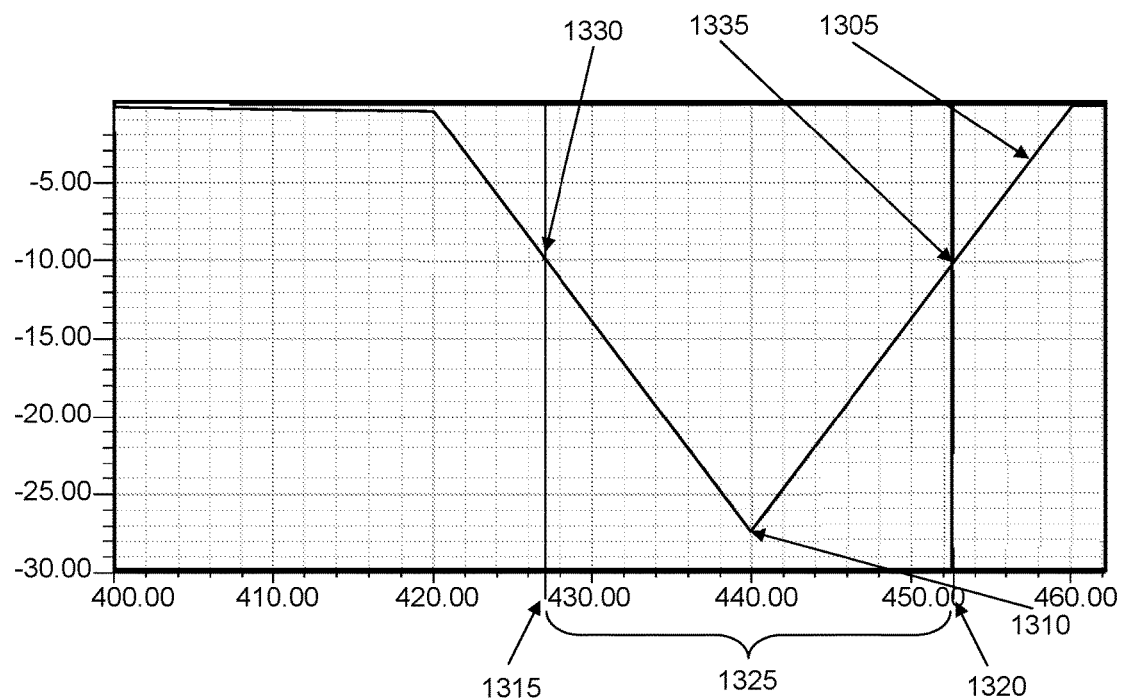
FIG. 13 is an S(1, 1) plot of planar wing-shaped antenna embodiment 11D configured in accordance with the present invention.

FIG. 13 is an S(1, 1) plot 1300 in dB for antenna embodiment 11D. Curve 1305 includes point m1 1310 with values of 440 MHz and −27.3585 dB. The curve's −10 dB points are from 427.1000 MHz 1315 to 452.7000 MHz 1320, a 25.600 MHz band 1325. Point 1330 value at 452.7000 MHz is −10.0064 dB. Point 1335 value at 443.4500 MHz is −10.0505 dB. A significant minimum exists at 440 MHz, providing sufficient bandwidth. Dimensions are: a=90 mm, length=110 mm, slot length=82 mm, slot width=1 mm, and t1 width=2 mm.

Figure 14:
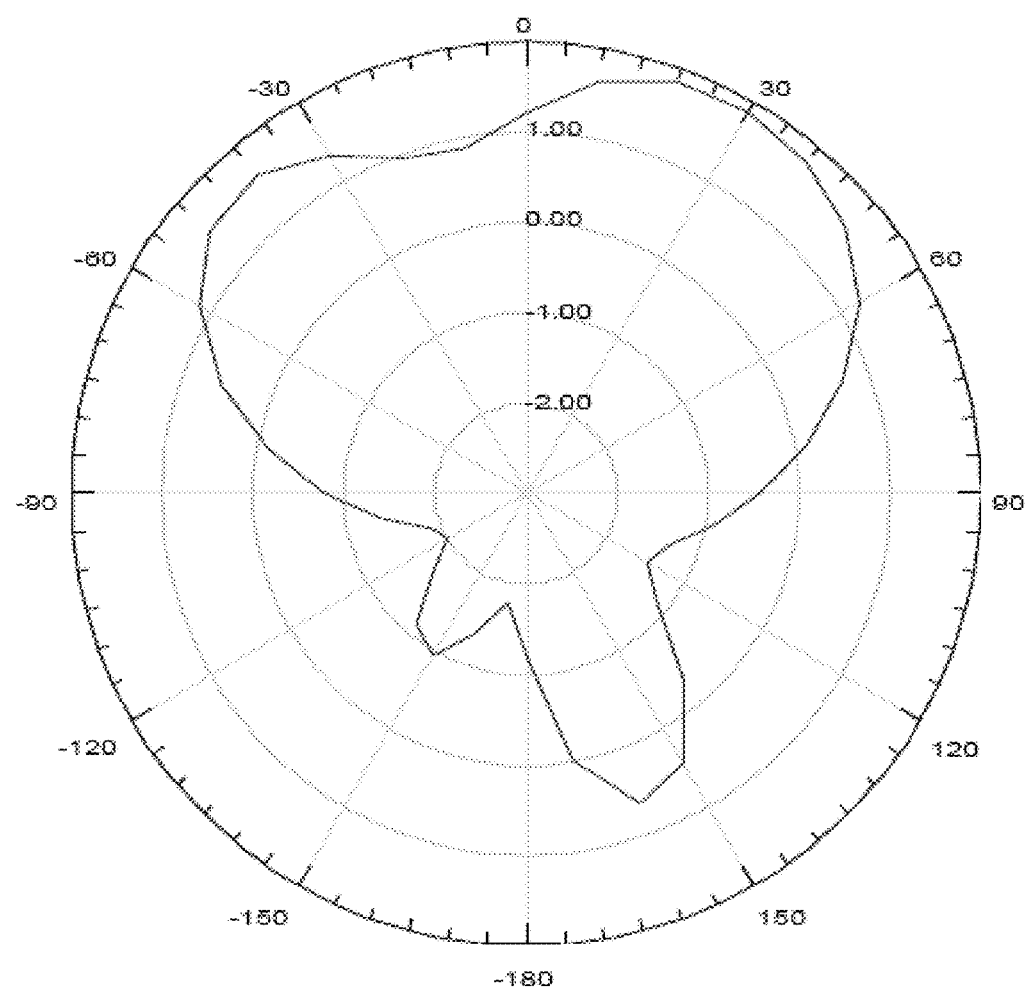
FIG. 14 is a radiation pattern plot of planar wing-shaped antenna configuration 11D.

FIG. 14 is radiation pattern 1400 in dB (total gain) of interim result antenna configuration 11D.

Other embodiments include variations on both a rectangular PIFWA and simple transmission line antenna (no short at the end). Antenna height was examined to determine if any benefits could be achieved by physically decoupling the antenna surface from the lossy glass top. Generally, for embodiments, less desirable results were found, so antenna height has been kept constant for embodiments, coincident with the bottom of the glass.

Figure 15:
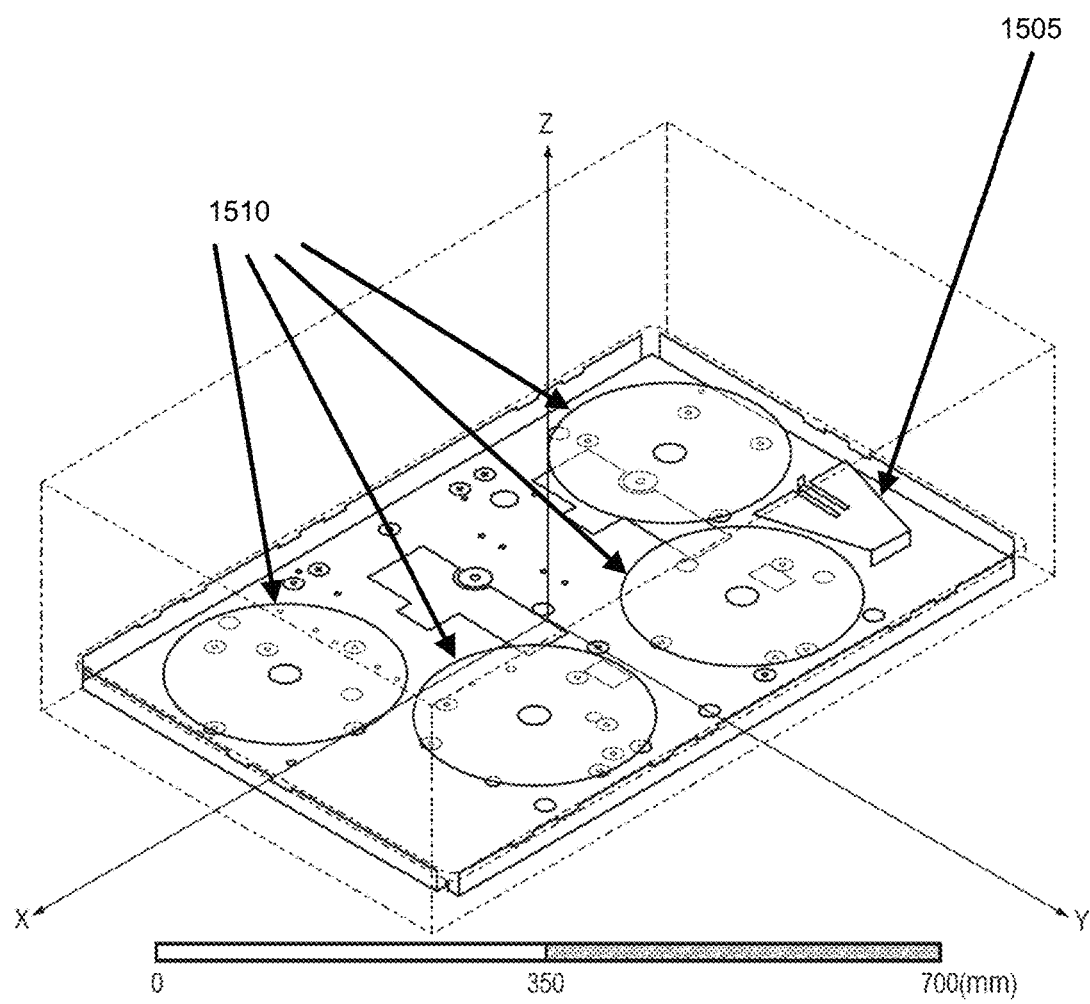
FIG. 15 depicts a perspective view of a cooktop with a narrow-feed PIFWA embodiment configured in accordance with the present invention.

FIG. 15 is a perspective scale-view of a cooktop with a narrow-feed PIFWA embodiment 1500 operating at 433 MHz. Cooktop includes corner-mounted, narrow-feed, PIFWA 1505 and cooking elements 1510. Embodiment designs comprised taking a free-space Planar Inverted-F-Antenna (PIFWA) assembly operating at 433 MHz and adapting it to the environment of an induction cooktop. An original PIFWA design conceived for stand-alone, open air applications and functioned well in free-space. Modifications to the original PIFWA design conceived for stand-alone, open air application were required by embodiments to accommodate the new cooktop environment.

Figure 16:
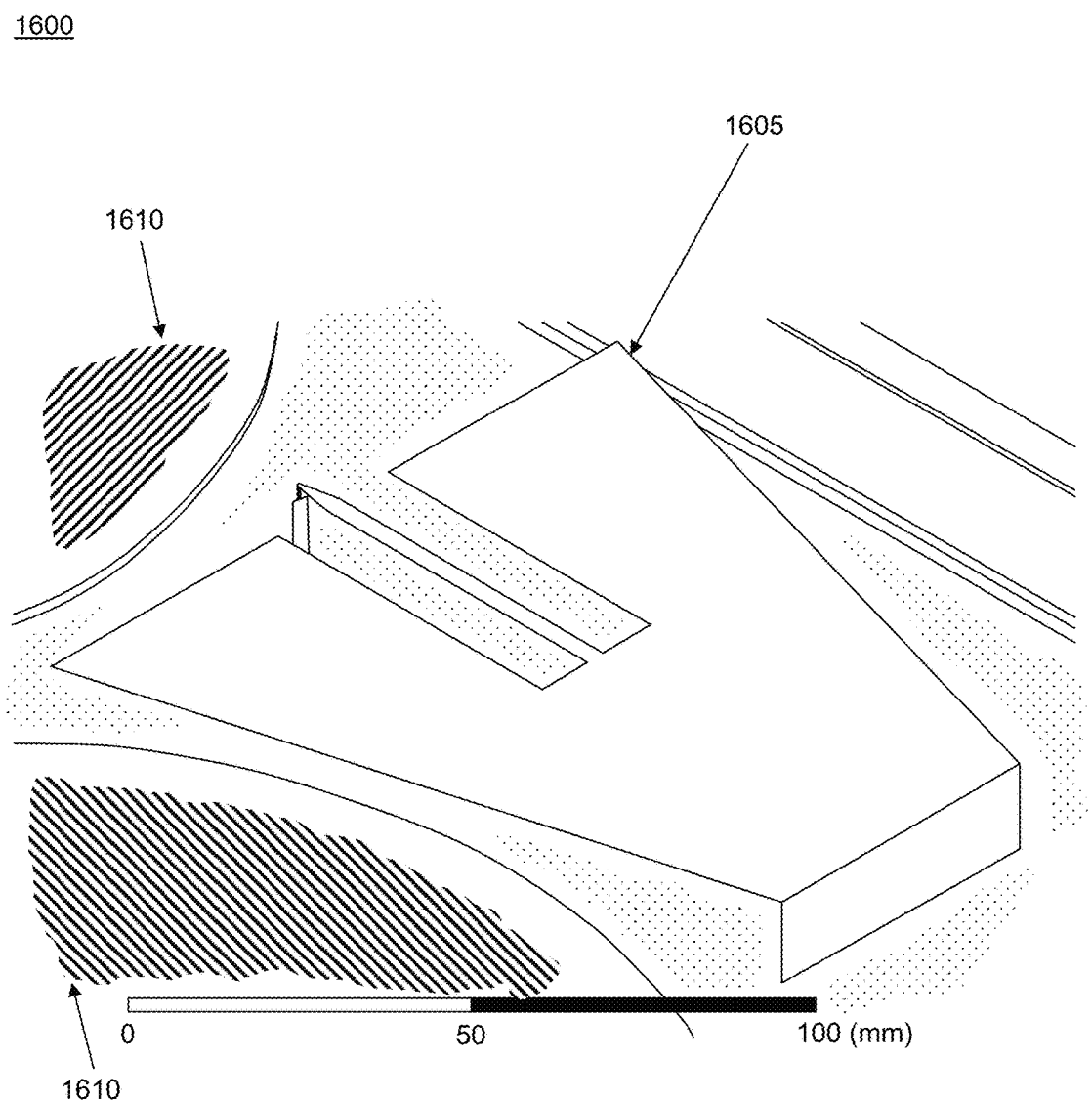
FIG. 16 depicts a scale trimetric perspective view of a section of a cooktop showing a narrow-feed PIFWA embodiment configured in accordance with the present invention.

FIG. 16 is a scale perspective view of the narrow-feed PIFWA embodiment antenna location 1600 determined with respect to the locations of induction coils, electronics, and pockets of empty space within the cooktop, and the size of the antenna. Cooktop includes corner-mounted, narrow-feed, PIFWA 1605 and cooking elements 1610. Two related embodiment locations are presented. These two locations, which are mirror images of each other, are the corner pockets of space formed between the cooktop undercarriage lip and two of the four induction coils. The antenna is fed through the thin microstrip traversing down the center of the geometry. This antenna embodiment has shorter overall length and width dimensions that the modeled free-space embodiment. The feeding microstrip is also significantly thinner.

Figure 17:
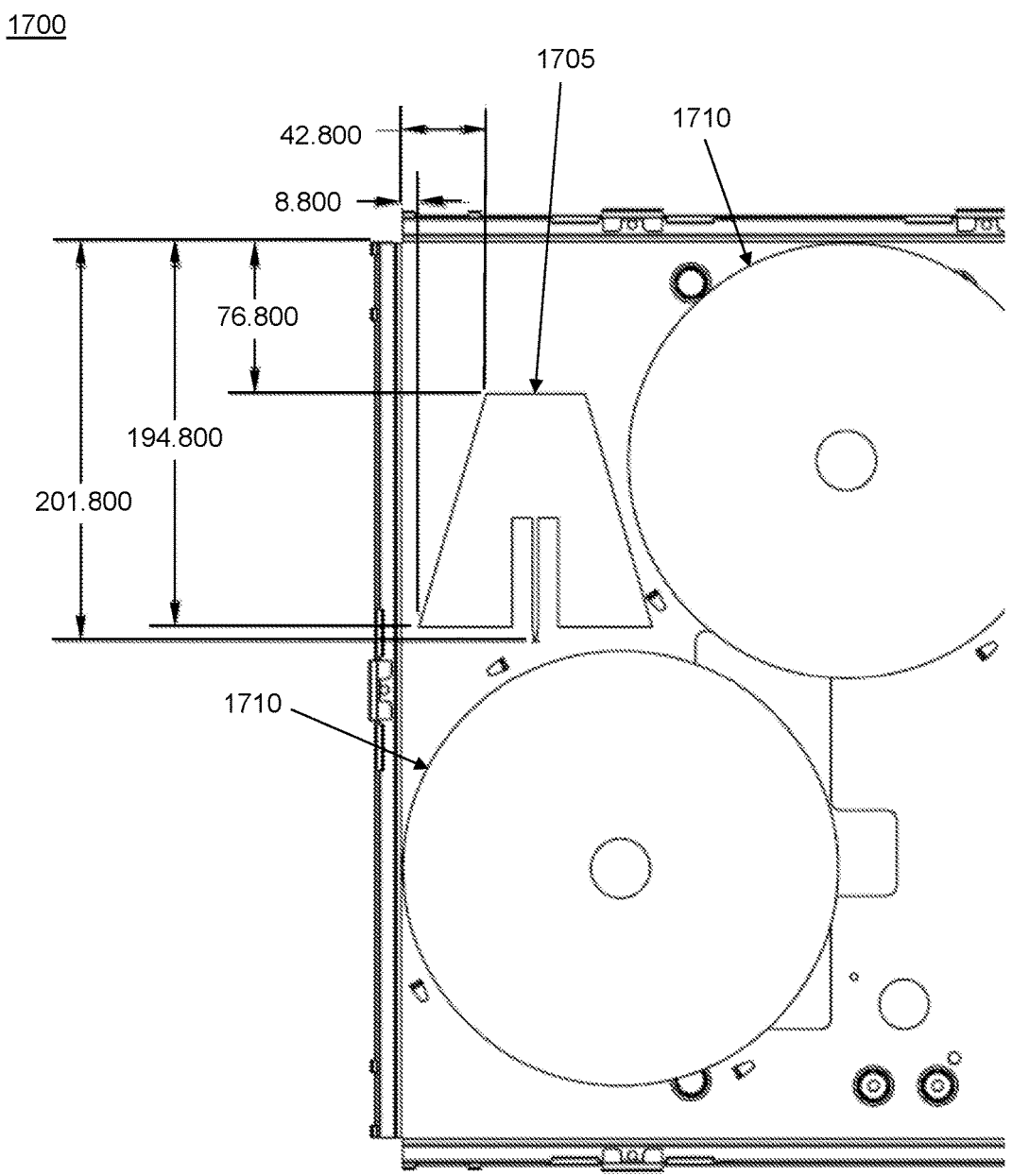
FIG. 17 depicts a scale plan view of a cooktop with a narrow-feed PIFWA embodiment configured in accordance with the present invention.

FIG. 17 is a scale plan view of the cooktop narrow-feed PIFWA embodiment 1700 showing dimensions within the cooktop. Cooktop includes corner-mounted, narrow-feed, PIFWA 1705 and cooking elements 1710.

Figure 18:
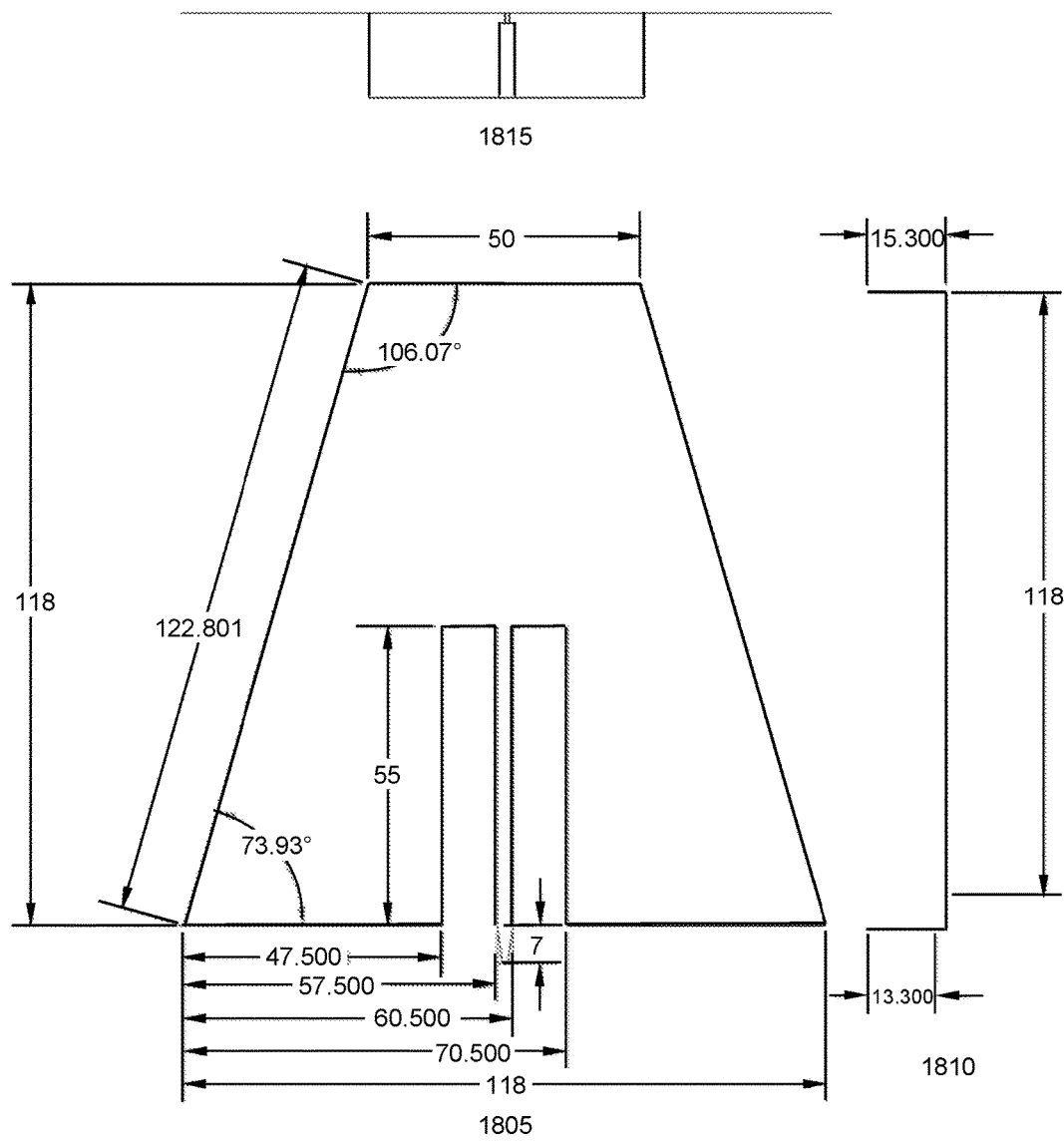
FIG. 18 depicts scale views of a narrow-feed PIFWA embodiment configured in accordance with the present invention.

FIG. 18 depicts orthogonal scale views of the cooktop narrow-feed PIFWA embodiment 1800 (also shown in FIG. 17) showing antenna dimensions. Orthogonal views include plan 1805, side 1810, and end 1815. Embodiments are made out of tinned metal. For embodiments, the antenna cable is soldered on the tip of the antenna, and the ground is connected to the cook top case. For embodiment tests the PIFWA was inside the induction cook top. Approximate embodiment dimensions comprise a shorting edge width approximately equal to the slot length. Overall length approximately equals overall width. Slot width approximately equals one fifth wing end width, and feed width is approximately one third slot width.

Figure 19:
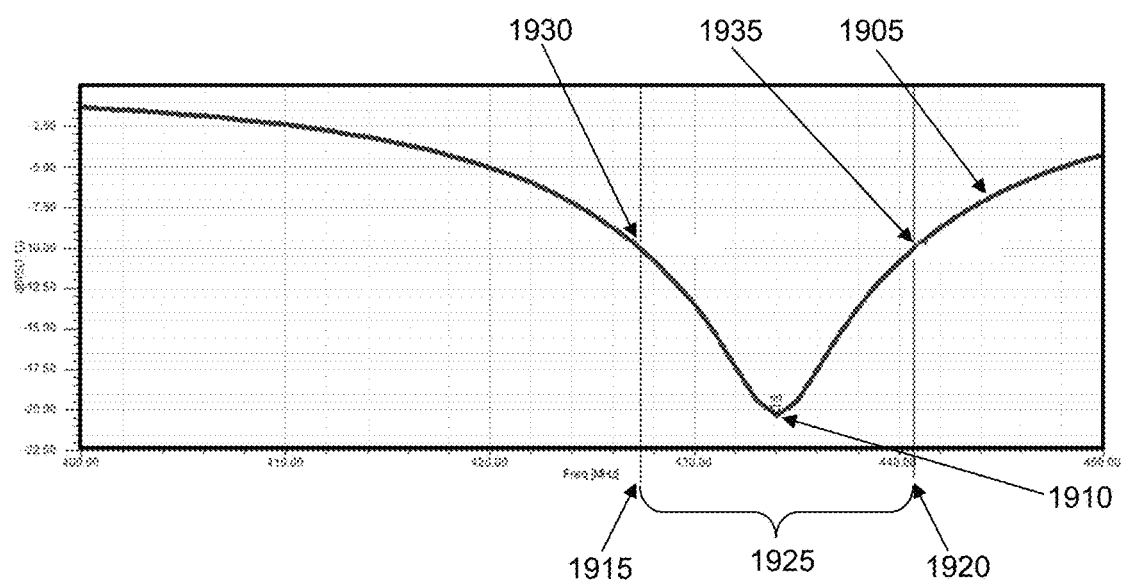
FIG. 19 is a reflection coefficient impedance bandwidth plot for the narrow-feed PIFWA embodiment in a cooktop of FIGS. 15-18 configured in accordance with the present invention.

FIG. 19 is a reflection coefficient and impedance bandwidth graph 1900 of the reflection coefficient for the narrow-feed PIFWA embodiment of FIGS. 15-18. Curve 1905 includes point m1 1910 with values of 434.0000 MHz and −20.3370 dB. The curve's −10 dB points are from 427.3585 MHz 1915 to 440.7233 MHz 1920, a 13.3648 MHz band 1925. Point 1930 value at 427.3585 MHz is −10.0954 dB. Point 1935 value at 440.7233 MHz is −10.0049 dB. It has a minimum value of −20 dB at 434 MHz, very close to the desired operating frequency of 433 MHz. As can be seen in the figure, an impedance bandwidth of approximately 13.4 MHz is obtained by using the narrow-feed PIFWA embodiment configuration depicted in FIGS. 15-18. This is outstanding performance resulting from the particular values for the many variables disclosed for this embodiment and the considerations involved.

Figure 20:
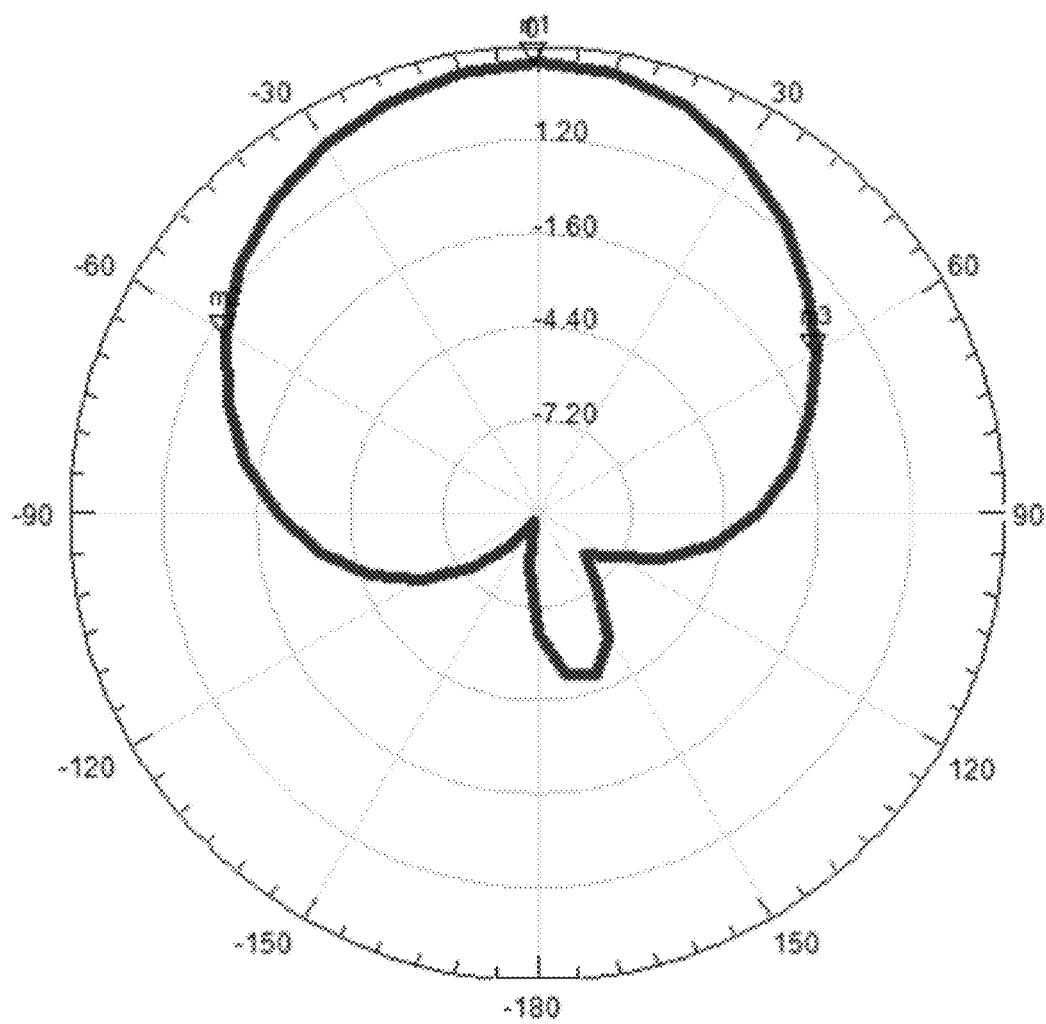
FIG. 20 is a broadside gain plot for the narrow-feed PIFWA embodiment in a cooktop of FIGS. 15-18 configured in accordance with the present invention.

FIG. 20 is a broadside radiation pattern gain 2000 for the cooktop narrow-feed PIFWA embodiment operating at 433 MHz seen in two dimensions. A peak gain value of 3.6 dB is found at the apex of the pattern. Moving 60 degrees to the left and right of this peak produce broadside gain values of 0.8 dB and −0.4 dB, respectively. The shape of the pattern is affected by the presence of the induction coils. For example, a small backside lobe is present in the pattern. Additionally, the pattern is comprised primarily of one large frontal lobe, similar to a monopole antenna. These attributes are in contrast to the pattern produced by the previous designs, which had no backside lobe and looked essentially like the radiation pattern of a dipole with a null point at the center. As with the plot of FIG. 19, this is outstanding performance resulting from the particular values for the many variables disclosed for this embodiment and the considerations involved.

Figure 21:
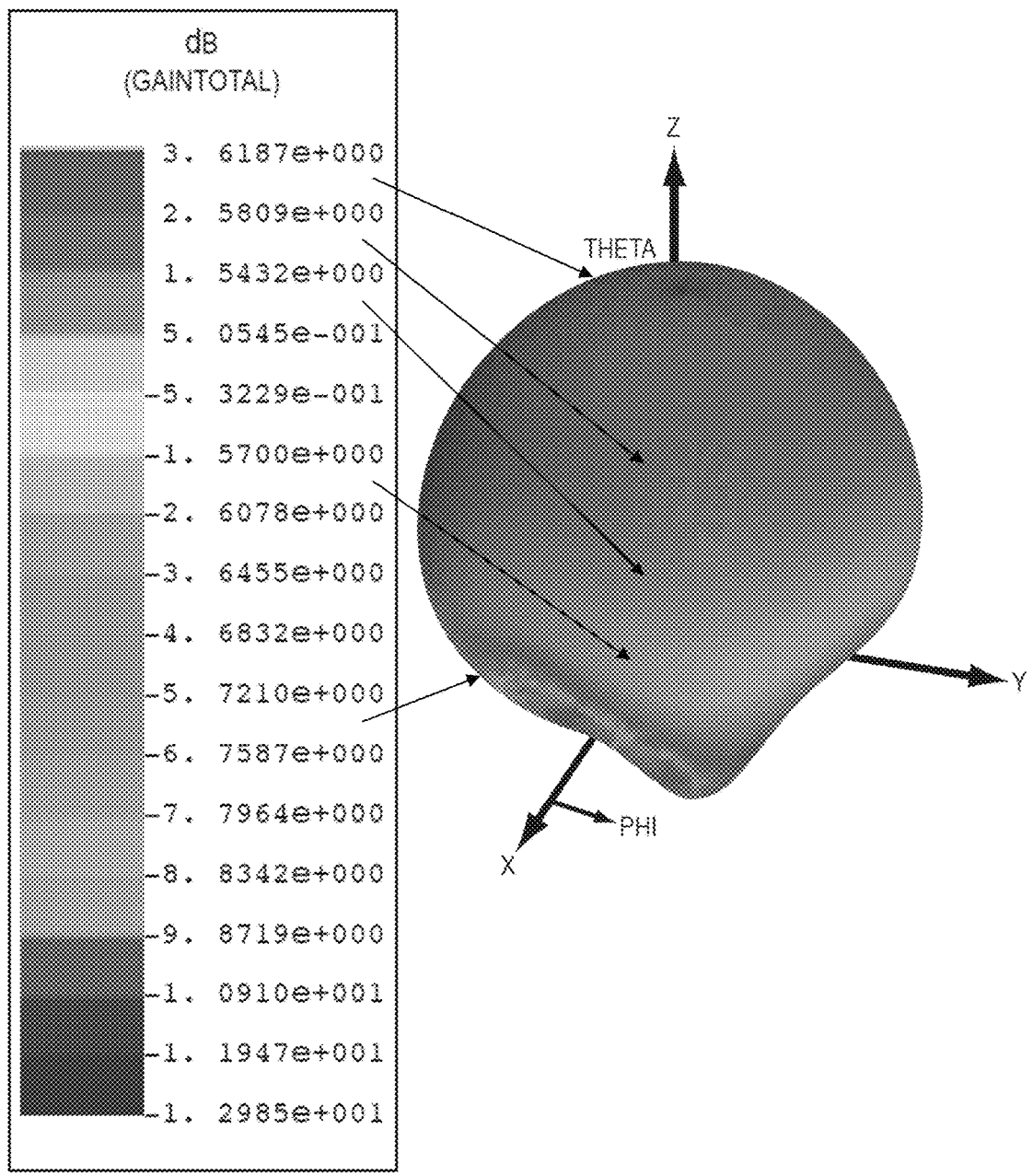
FIG. 21 depicts broadside gain in three dimensions, trimetric view for the narrow-feed PIFWA embodiment in a cooktop of FIGS. 15-18 configured in accordance with the present invention.

FIG. 21 is a radiation pattern gain 2100 in three dimensions for the cooktop narrow-feed PIFWA embodiment operating at 433 MHz, trimetric view.

Figure 22:
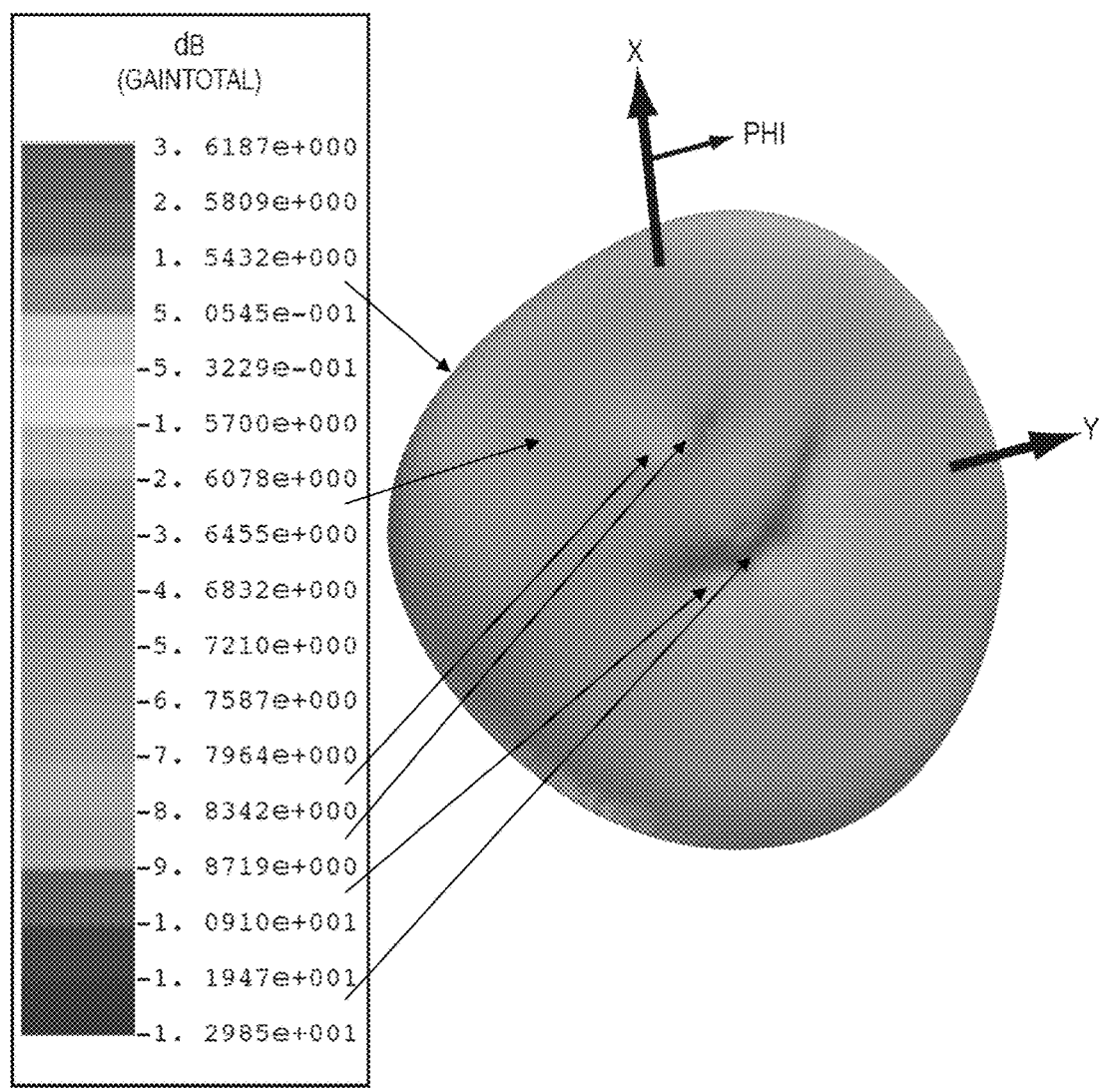
FIG. 22 depicts broadside gain bottom view for the narrow-feed PIFWA embodiment in a cooktop of FIGS. 15-18 configured in accordance with the present invention.

FIG. 22 is a bottom view radiation pattern gain 2200 in three dimensions for the cooktop narrow-feed PIFWA embodiment operating at 433 MHz.

Figure 23:
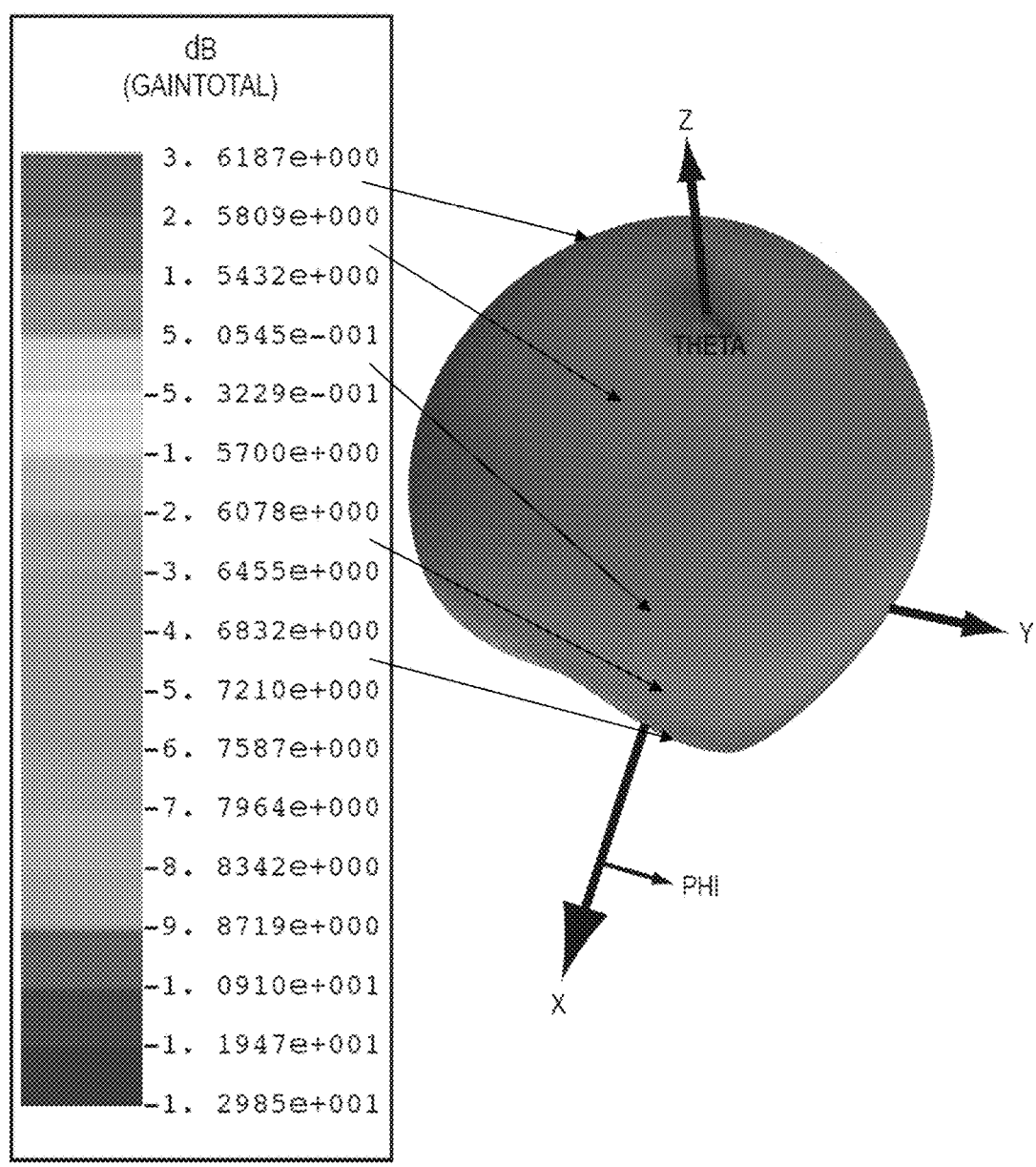
FIG. 23 depicts broadside gain top view for the narrow-feed PIFWA embodiment in a cooktop of FIGS. 15-18 configured in accordance with the present invention.

FIG. 23 is a top view radiation pattern gain 2300 in three dimensions for cooktop narrow-feed PIFWA embodiment operating at 433 MHz. The beginnings of the formulation of a null seem to be starting, but this is much more subtle than in the traditional PIFWA pattern. As mentioned above, the radiation pattern of the antenna is unorthodox with respect to the general PIFWA topology. For embodiments, modifying the pattern is accomplished by increasing the antenna width at the base or including various parasitically excited objects either along the feed line or at the edges of the base. For some embodiments, a 3 mm separation distance between the antenna and coils must be maintained. In embodiments, parasitically excited monopoles realized with one or more screws attached to the cooktop base are placed along the microstrip feed to help shape the pattern into a more traditional shape. For embodiments, simpler designs (i.e., rectangular and circular microstrips, etc.) are used; dimension restrictions give considerations for these configurations.

Figure 24:
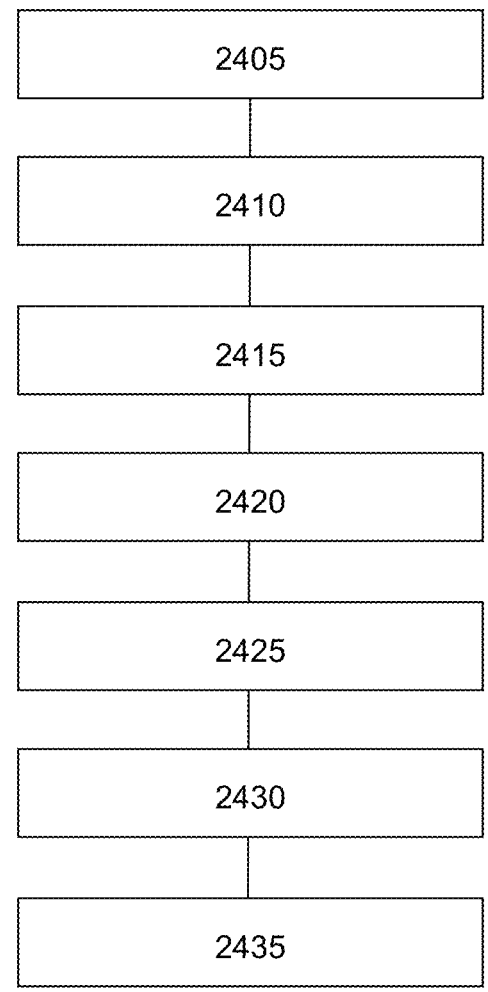
FIG. 24 depicts a method of use of a cooktop with a PIFWA configured in accordance with the present invention.

FIG. 24 is a method of use flow chart 2400 for PIFWA embodiments. Steps comprise providing a cooktop comprising a PIFWA 2405; providing a Surface Acoustic Wave (SAW) probe 2410 for measuring cooking subject matter; initiating cooking 2415; transmitting from the PIFWA to the probe 2420; receiving a SAW signal at the PIFWA from the probe corresponding to a measurement 2425; decoding the measurement value from the SAW signal received at the PIFWA 2430; and responding to value by providing indication of influence of value on the cooking subject matter 2435 (such as doneness).

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. A Planar Inverted-F Wing Antenna (PIFWA) device comprising:
   a feed end;
   a shorting end opposite said feed end;
   a single feed section between a first slot and a second slot;
   a first wing section on a side of said first slot opposite said feed section; and
   a second wing section on a side of said second slot opposite said single feed section;
   wherein dimensions of said PIFWA comprise:
   a shorting edge width approximately equal to a slot length;
   an overall length approximately equal to an overall width;
   a slot width approximately equal to one fifth of a wing end width; and
   a feed leg width approximately one third of said slot width;
   wherein outline configuration of said PIFWA in plane of said PIFWA is an isosceles triangle with a truncated vertex end opposite a base side;
   said PIFWA device is located proximate a culinary appliance.

2. The Planar Inverted-F Wing Antenna (PIFWA) device of claim 1 wherein said culinary appliance is a cooktop.

3. The Planar Inverted-F Wing Antenna (PIFWA) device of claim 1 wherein said culinary appliance is an induction cooktop.

4. The Planar Inverted-F Wing Antenna (PIFWA) device of claim 1 wherein a feed side of said PIFWA is aligned perpendicular to an adjacent side of a cooktop, located proximate a corner of said cooktop.

5. The Planar Inverted-F Wing Antenna (PIFWA) device of claim 1 wherein operating frequency of said PIFWA is about 433 MHz.

6. The Planar Inverted-F Wing Antenna (PIFWA) device of claim 1 wherein an impedance bandwidth for said antenna is at least about 13 MHz.

7. The Planar Inverted-F Wing Antenna (PIFWA) device of claim 1 wherein a maximum gain of said PIFWA is about 3.6 dB.

8. The Planar Inverted-F Wing Antenna (PIFWA) device of claim 1 wherein said culinary appliance is an oven.

9. The Planar Inverted-F Wing Antenna (PIFWA) device of claim 1 wherein said culinary appliance is selected from the group comprising a pressure cooker and a combosteamer.

10. The Planar Inverted-F Wing Antenna (PIFWA) device of claim 1 wherein said PIFWA communicates with a surface acoustic wave (SAW) sensor.

11. The Planar Inverted-F Wing Antenna (PIFWA) device of claim 1 wherein said PIFWA communicates with a surface acoustic wave (SAW) sensor and values of measurements made by said sensor are used to control power of said culinary appliance.

12. The Planar Inverted-F Wing Antenna (PIFWA) device of claim 1 wherein said PIFWA is located within a cooktop, said location comprising:
   a shorting edge of said shorting end, said shorting edge parallel to and separated from a first inner side of said cooktop by about 76.8 mm measured perpendicular to said shorting edge;
   a corner of said first wing, said corner of said first wing proximate a second inner side of said cooktop, said corner of said first wing separated from said second inner side of said cooktop by about 8.8 mm.

13. The Planar Inverted-F Wing Antenna (PIFWA) device of claim 1 wherein dimensions of said antenna comprise:
   an overall length of about 118 mm;
   an overall width of about 118 mm;
   a wing width of about 47.5 mm;
   a wing outer edge length of about 122.8 mm;
   a feed leg width of about 3 mm;
   slot widths of about 10 mm each;
   a slot length of about 55 mm; and
   an overall height of about 15.3 mm.

14. A method for measuring physical parameter values with a culinary appliance comprising the steps of:
   providing at least one Planar Inverted-F Wing Antenna (PIFWA) proximate said culinary appliance;
   wherein outline configuration of said PIFWA in plane of said PIFWA is an isosceles triangle with a truncated vertex end opposite a base side;
   wherein dimensions of said PIFWA comprise:
   a shorting edge width approximately equal to a slot length;
   an overall length approximately equal to an overall width;
   a slot width approximately equal to one fifth of a wing end width; and
   a feed leg width approximately one third of said slot width;
   transmitting at least one RF signal from said at least one PIFWA;
   receiving at at least one wireless sensor, said RF signal transmitted from said PIFWA;
   radiating from said at least one wireless sensor, at least one RF signal;
   receiving, at said at least one PIFWA, said radiated signal from said at least one wireless sensor;
   said at least one RF signal transmitted from said at least one PIFWA and said at least one RF signal radiated from said at least one wireless sensor corresponding to said measured physical parameter values.

15. The method of claim 14 wherein said at least one wireless sensor is a surface acoustic wave (SAW) sensor.

16. The method of claim 15 wherein said at least one surface acoustic wave (SAW) sensor is a temperature sensor.

17. The method of claim 14 wherein said culinary appliance is a cooktop.

18. The method of claim 14 wherein said at least one wireless sensor is a surface acoustic wave (SAW) temperature probe.

19. A system for measuring physical parameter values with a culinary appliance with a Planar Inverted-F Wing Antenna (PIFWA) comprising:
   a PIFWA feed end;
   a PIFWA shorting end opposite said feed end;

a PIFWA feed section between a first slot and a second slot, said single feed section extending beyond line of a base side;

a PIFWA first wing section on a side of said first slot opposite said feed section;

a PIFWA second wing section on a side of said second slot opposite said feed section;

wherein dimensions of said PIFWA comprise:

a shorting edge width approximately equal to a slot length;

an overall length approximately equal to an overall width;

a slot width approximately equal to one fifth of a wing end width; and a feed leg width approximately one third of said slot width;

wherein outline configuration of said PIFWA in plane of said PIFWA is an isosceles triangle with a truncated vertex end opposite a base side;

said PIFWA is located proximate a culinary appliance; and said PIFWA providing RF communication with a surface acoustic wave (SAW) sensor whereby values of measurements made by said sensor are used to control power of said culinary appliance.

20. A Planar Inverted-F Wing Antenna (PIFWA) device comprising:

a feed end;

a shorting end opposite said feed end;

a single feed section between a first slot and a second slot;

a first wing section on a side of said first slot opposite said feed section; and a second wing section on a side of said second slot opposite said single feed section;

wherein outline configuration of said PIFWA in plane of said PIFWA is an isosceles triangle with a truncated vertex end opposite a base side; and wherein a feed side of said PIFWA is aligned perpendicular to an adjacent side of a cooktop, located proximate a corner of said cooktop.

21. A Planar Inverted-F Wing Antenna (PIFWA) device comprising:

a feed end;

a shorting end opposite said feed end;

a single feed section between a first slot and a second slot;

a first wing section on a side of said first slot opposite said feed section; and a second wing section on a side of said second slot opposite said single feed section;

wherein outline configuration of said PIFWA in plane of said PIFWA is an isosceles triangle with a truncated vertex end opposite a base side; and wherein said PIFWA is located within a cooktop, said location comprising:

a shorting edge of said shorting end, said shorting edge parallel to and separated from a first inner side of said cooktop by about 76.8 mm measured perpendicular to said shorting edge;

a corner of said first wing, said corner of said first wing proximate a second inner side of said cooktop, said corner of said first wing separated from said second inner side of said cooktop by about 8.8 mm.

* * * * *